(12) United States Patent
Itagaki et al.

(10) Patent No.: US 12,460,680 B2
(45) Date of Patent: Nov. 4, 2025

(54) TRIPOD TYPE CONSTANT VELOCITY UNIVERSAL JOINT

(71) Applicant: NTN Corporation, Osaka (JP)

(72) Inventors: Taku Itagaki, Shizuoka (JP); Tatsuro Sugiyama, Shizuoka (JP); Minoru Ishijima, Shizuoka (JP)

(73) Assignee: NTN Corporation, Osaka (JP)

( * ) Notice: Subject to any disclaimer, the term of this patent is extended or adjusted under 35 U.S.C. 154(b) by 431 days.

(21) Appl. No.: 17/927,119

(22) PCT Filed: May 13, 2021

(86) PCT No.: PCT/JP2021/018270
§ 371 (c)(1),
(2) Date: Nov. 22, 2022

(87) PCT Pub. No.: WO2021/246129
PCT Pub. Date: Dec. 9, 2021

(65) Prior Publication Data
US 2023/0204078 A1  Jun. 29, 2023

(30) Foreign Application Priority Data

Jun. 1, 2020 (JP) .................................. 2020-095337
Mar. 25, 2021 (JP) .................................. 2021-052157

(51) Int. Cl.
*F16D 3/205* (2006.01)
*F16D 3/202* (2006.01)

(52) U.S. Cl.
CPC .......... *F16D 3/205* (2013.01); *F16D 3/2055* (2013.01); *F16D 2003/2026* (2013.01); *Y10S 464/905* (2013.01)

(58) Field of Classification Search
CPC .................. F16D 3/205; F16D 3/2055; F16D 2003/2026; Y10S 464/905
(Continued)

(56) References Cited

U.S. PATENT DOCUMENTS 6,478,682 B1 * 11/2002 Kura ..................... F16D 3/2055
464/111
6,776,719 B2 * 8/2004 Perrow ................. F16D 3/2055
464/111
(Continued)

FOREIGN PATENT DOCUMENTS

JP   2001-132766   5/2001
JP   2005-054834   3/2005
(Continued)

OTHER PUBLICATIONS

International Preliminary Report on Patentability and Written Opinion of the International Searching Authority dated Dec. 6, 2022 in International (PCT) Application No. PCT/JP2021/018270.
(Continued)

*Primary Examiner* — Greg Binda
(74) *Attorney, Agent, or Firm* — WENDEROTH, LIND & PONACK, L.L.P.

(57) ABSTRACT

A tripod type constant velocity universal joint includes an outer joint member having three track grooves each including roller guide surfaces opposing each other in a circumferential direction of each of the track grooves, a tripod member including three leg shafts, and roller units each including a roller and an inner ring to support the roller. An outer peripheral surface of the roller has a partially spherical surface having a curvature center on an axis of each of the leg shafts. The roller guide surfaces are each formed of a partially cylindrical surface having a curvature center on a horizontal line passing an intersection of a pitch circle of the track grooves and a center line of each of the track grooves, and when no torque is applied to the joint, an end portion of the outer peripheral surface of the roller abuts against the roller guide surfaces.

7 Claims, 20 Drawing Sheets

(58) Field of Classification Search
USPC .......................................................... 464/111
See application file for complete search history.

(56) References Cited

U.S. PATENT DOCUMENTS

| | | |
|---|---|---|
| 2003/0232655 A1 | 12/2003 | Perrow |
| 2005/0037849 A1 | 2/2005 | Izumino et al. |
| 2009/0312108 A1 | 12/2009 | Oh |

FOREIGN PATENT DOCUMENTS

| | | |
|---|---|---|
| JP | 2005-098402 | 4/2005 |
| JP | 3949865 | 7/2007 |
| JP | 2020-046063 | 3/2020 |
| KR | 10-2006-0134672 | 12/2006 |

OTHER PUBLICATIONS

International Search Report issued Jun. 22, 2021, in International (PCT) Application No. PCT/JP2021/018270, with English translation.

* cited by examiner

TRIPOD TYPE CONSTANT VELOCITY UNIVERSAL JOINT

TECHNICAL FIELD

This invention relates to a tripod type constant velocity universal joint.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when the two shafts form an operating angle. The constant velocity universal joint is roughly classified into a fixed type constant velocity universal joint that allows only angular displacement, and a plunging type constant velocity universal joint that allows both the angular displacement and axial displacement. In a drive shaft for transmitting power from an engine of an automobile to a driving wheel, for example, the plunging type constant velocity universal joint is used on a differential side (inboard side), and the fixed type constant velocity universal joint is used on a driving wheel side (outboard side).

As one type of plunging type constant velocity universal joints, tripod type constant velocity universal joints are known. As the tripod type constant velocity universal joints, there are known a joint in which a roller being a torque transmission member is of a single roller type, and a joint in which the roller is of a double roller type. The present invention is directed to a tripod type constant velocity universal joint of the double roller type as described in, for example, Patent Literature 1. The tripod type constant velocity universal joint of the double roller type (hereinafter simply referred to as "tripod type constant velocity universal joint") includes, as main components, an outer joint member, a tripod member serving as an inner joint member, and roller units serving as torque transmission members.

The outer joint member has an inner peripheral surface having three linear track grooves equiangularly formed therein so as to extend in an axial direction. On both sides of each of the track grooves, there are formed roller guide surfaces arranged to face each other in a circumferential direction and each extending in the axial direction. The outer joint member receives therein the tripod member and the roller units. The tripod member includes three leg shafts projecting in a radial direction. The roller units each include, as main components, a roller, an inner ring arranged inside the roller and externally fitted to each of the leg shafts, and a plurality of needle rollers interposed between the roller and the inner ring. The roller units are received in the track grooves of the outer joint member, respectively. An inner peripheral surface of the inner ring is formed of an arc-shaped protruding surface in a longitudinal section containing an axis of the inner ring.

An outer peripheral surface of each of the leg shafts of the tripod member has a straight shape in a longitudinal section containing an axis of each of the leg shafts, and has a substantially elliptic shape in a cross section orthogonal to the axis of each of the leg shafts. The outer peripheral surface of each of the leg shafts is brought into contact with the inner peripheral surface of the inner ring in a direction orthogonal to an axis of the joint, and defines a gap in a direction of the axis of the joint together with the inner peripheral surface of the inner ring. In this tripod type constant velocity universal joint, the roller of the roller unit fitted to each of the leg shafts of the tripod member rolls on the roller guide surfaces of each of the track grooves of the outer joint member. Each of the leg shafts has a substantially elliptic cross section, and hence an axis of the tripod member is inclined with respect to an axis of the outer joint member when the tripod type constant velocity universal joint takes an operating angle. However, the roller unit can be inclined with respect to the axis of each of the leg shafts of the tripod member. Accordingly, the roller rolls on the roller guide surfaces properly, and thus induced thrust and sliding resistance can be reduced, thereby being capable of achieving reduction in vibration of the joint.

PRIOR ART DOCUMENTS

Patent Documents

Patent Document 1: JP 2001-132766 A

SUMMARY OF THE INVENTION

Problems to be Solved by the Invention

Incidentally, for example, in a case in which a drive shaft assembly including the tripod type constant velocity universal joint mounted to one end thereof is assembled to a vehicle, under a state in which no torque is applied to the joint (hereinafter simply referred to as "under application of no torque" in some cases), it is desired that the roller being an internal component of the tripod type constant velocity universal joint smoothly slide on the outer joint member.

In the tripod type constant velocity universal joint as proposed in Patent Document 1, an outer peripheral surface of the roller is formed of a partially spherical surface having a curvature center on the axis of each of the leg shafts of the tripod member, and the roller guide surfaces are each formed of a partially cylindrical surface parallel to the axis of the outer joint member. With this configuration, the roller can also be inclined in each of the track grooves. When a contact mode between the roller and each roller guide surface is circular contact, the roller is brought into contact with the roller guide surface at one point. However, when a ratio R/r of a curvature radius R of the roller guide surface to a curvature radius "r" of an outer spherical surface of the roller is large, under application of no torque described above, a contact angle between the roller and the roller guide surface is reduced, and thus a frictional force generated between the outer spherical surface of the roller and the roller guide surface is increased. It was found that, as a result, smooth sliding of the roller under application of no torque may be hindered.

In view of the above-mentioned problems, it is an object of the present invention to provide a tripod type constant velocity universal joint that allows a roller to smoothly slide on roller guide surfaces under a state in which no torque is applied to the joint.

Solutions to the Problems

As a result of various studies conducted for achieving the above-mentioned object, the inventors of the present invention have arrived at the present invention based on such a novel idea setting a large contact angle between an outer peripheral surface of a roller and a roller guide surface under application of no torque in a tripod type constant velocity universal joint of a double roller type.

As technical means to achieve the above-mentioned object, according to the present invention, there is provided a tripod type constant velocity universal joint, comprising: an outer joint member having three track grooves each comprising roller guide surfaces arranged so as to be opposed to each other in a circumferential direction of each of the track grooves; a tripod member comprising three leg shafts projecting in a radial direction of the tripod member; and roller units each comprising a roller and an inner ring configured to support the roller in a freely rotatable manner, the inner ring being externally fitted to each of the leg shafts, the roller being movable along the roller guide surfaces of each of the track grooves, the inner ring comprising an inner peripheral surface formed into an arc-shaped protruding surface in a longitudinal section of the inner ring, each of the leg shafts comprising an outer peripheral surface having a straight shape in a longitudinal section containing an axis of each of the leg shafts, and having a substantially elliptic shape in a cross section orthogonal to the axis of each of the leg shafts, the outer peripheral surface of each of the leg shafts being brought into abutment against the inner peripheral surface of the inner ring in a direction orthogonal to an axis of the joint, and defining a gap in a direction of the axis of the joint together with the inner peripheral surface of the inner ring, the roller being capable of inclining in each of the track grooves, wherein an outer peripheral surface of the roller is formed of a partially spherical surface having a curvature center on the axis of each of the leg shafts, wherein the roller guide surfaces are each formed of a partially cylindrical surface having a curvature center on a horizontal line passing an intersection of a pitch circle of the track grooves and a center line of each of the track grooves, and wherein under a state in which no torque is applied to the joint, an end portion of the outer peripheral surface of the roller is held in abutment against the roller guide surfaces.

With the above-mentioned configuration, the contact angle between the outer peripheral surface of the roller and each roller guide surface under application of no torque can be set to a large angle, thereby being capable of achieving the tripod type constant velocity universal joint that allows the roller to smoothly slide on the roller guide surfaces under application of no torque.

Specifically, it is desired that a contact ratio R/r of a curvature radius R of the partially cylindrical surface of each of the roller guide surfaces to a curvature radius "r" of the partially spherical surface of the outer peripheral surface of the roller be set to satisfy 0.95≤R/r≤1.08. With this, there can be achieved the tripod type constant velocity universal joint having high practicality in terms of not only performance in smooth sliding of the roller on the roller guide surfaces under application of no torque, but also manufacture. Here, in this specification and Claims, by definition, the contact ratio refers to a ratio R/r of the curvature radius R of the partially cylindrical surface of the roller guide surface to the curvature radius "r" of the partially spherical surface of the outer peripheral surface of the roller.

A plurality of rolling elements are arranged between the inner ring and the roller. Thus, the inner ring and the roller can smoothly rotate relative to each other.

The above-mentioned rolling elements comprise needle rollers. Thus, the inner ring and the roller can smoothly rotate relative to each other, and internal components can be reduced in size.

A rounded portion having a curvature radius smaller than the curvature radius "r" of the partially spherical surface of the outer peripheral surface of the roller can be formed at each end portion of the outer peripheral surface of the roller. With this, an edge load can be effectively avoided, thereby being capable of improving durability of the roller guide surfaces.

A widthwise center region of the outer peripheral surface of the roller can be formed of a partially spherical surface, and a retreat portion can be formed in a region extending from the widthwise center region to the both end portions of the outer peripheral surface of the roller, and the outer peripheral surface of the roller can have a convex shape. With this, during torque transmission, a contact pressure is relaxed, thereby being capable of improving durability of the roller guide surfaces.

According to a second invention, there is provided a tripod type constant velocity universal joint, comprising: an outer joint member having three track grooves each comprising roller guide surfaces arranged so as to be opposed to each other in a circumferential direction of each of the track grooves; a tripod member comprising three leg shafts projecting in a radial direction of the tripod member; and roller units each comprising a roller and an inner ring configured to support the roller in a freely rotatable manner, the inner ring of each of the roller units being externally fitted to each of the leg shafts, the roller units being capable of inclining with respect to the leg shafts, respectively, the roller being movable along the roller guide surfaces of each of the track grooves, and being capable of inclining in each of the track grooves, wherein an outer peripheral surface of the roller is formed of a partially spherical surface having a curvature center on an axis of each of the leg shafts, wherein the roller guide surfaces are each formed of a partially cylindrical surface having a curvature center on a horizontal line passing an intersection of a pitch circle of the track grooves and a center line of each of the track grooves, and wherein a contact ratio R/r of a curvature radius R of the partially cylindrical surface of each of the roller guide surfaces to a curvature radius "r" of the partially spherical surface of the outer peripheral surface of the roller is set to satisfy 0.95≤R/r≤1.08 so that induced thrust of the joint is reduced.

Effects of the Invention

According to the present invention, the contact angle between the outer peripheral surface of the roller and each roller guide surface under application of no torque can be set to a large angle, thereby being capable of achieving the tripod type constant velocity universal joint that allows the roller to smoothly slide on the roller guide surfaces even under application of no torque.

EMBODIMENTS OF THE INVENTION

Figure 1:
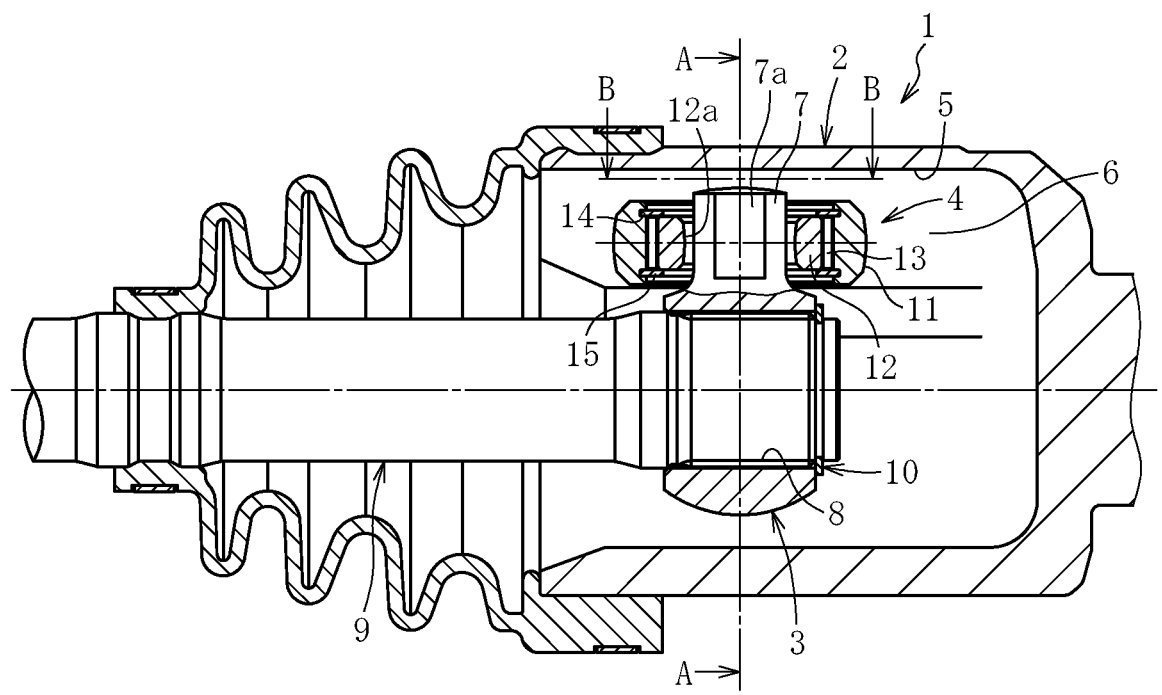
FIG. 1 is a longitudinal sectional view for illustrating a tripod type constant velocity universal joint according to a first embodiment of the present invention.
Figure 2:
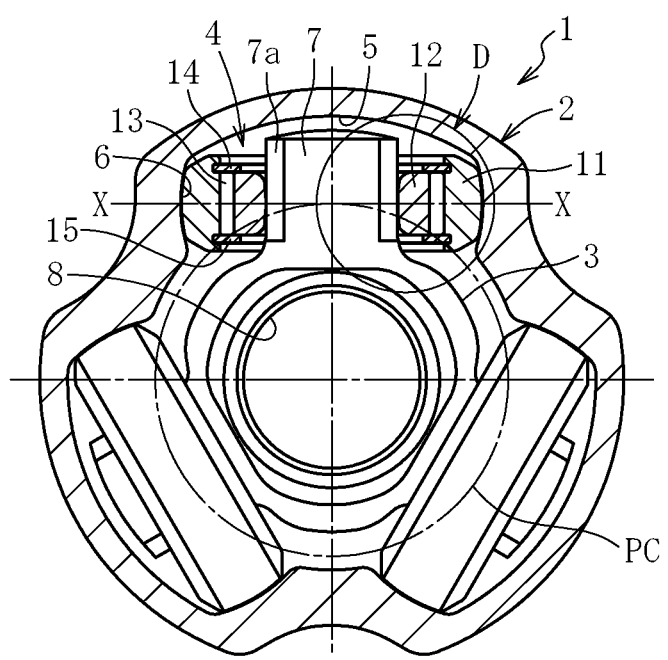
FIG. 2 is a cross-sectional view taken along the line A-A of FIG. 1 and seen in the direction indicated by the arrows.
Figure 3:
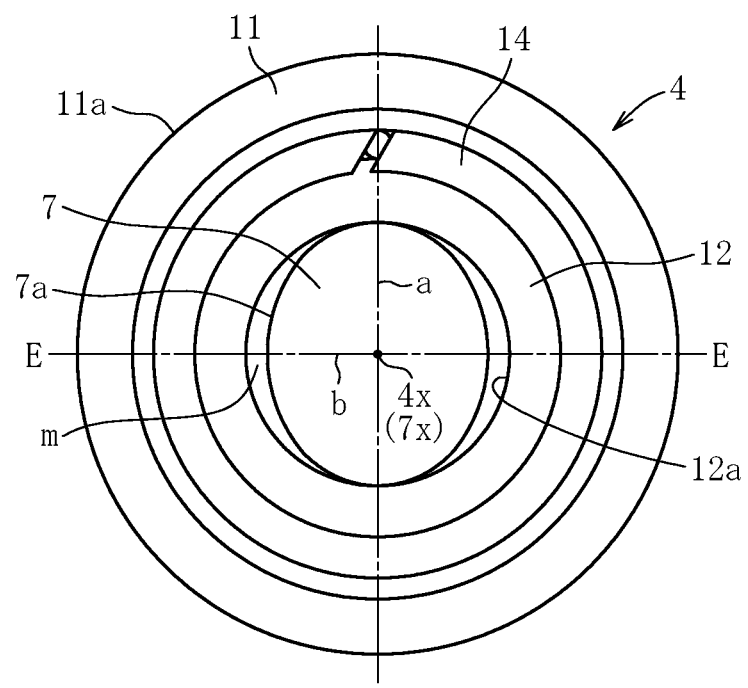
FIG. 3 is a plan view for illustrating a roller unit and a leg shaft seen in the direction indicated by the arrows of the line B-B of FIG. 1.
Figure 4:
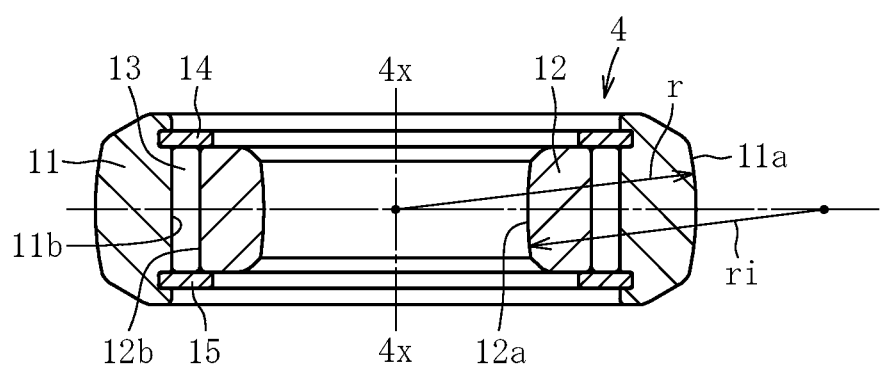
FIG. 4 is a longitudinal sectional view for illustrating the roller unit taken along the line E-E of FIG. 3.
Figure 5:
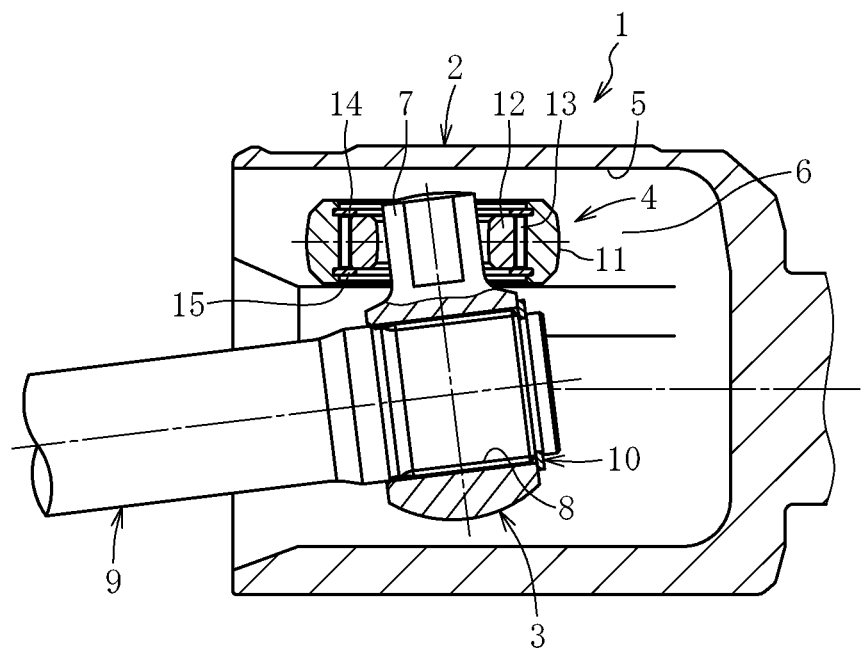
FIG. 5 is a longitudinal sectional view for illustrating a state in which the tripod type constant velocity universal joint of FIG. 1 takes a normal operating angle.
Figure 6:
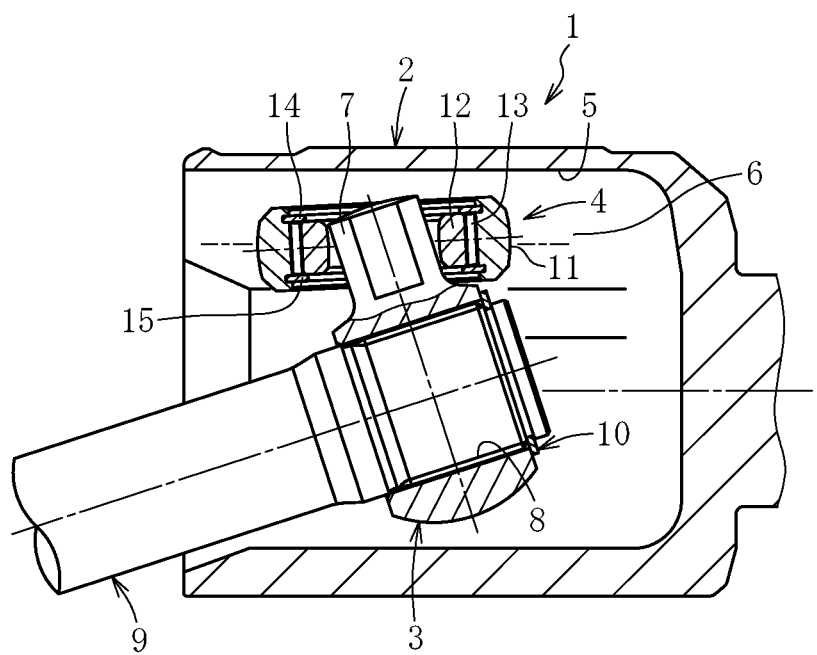
FIG. 6 is a longitudinal sectional view for illustrating a state in which the tripod type constant velocity universal joint of FIG. 1 takes an operating angle larger than the normal operating angle.

A tripod type constant velocity universal joint according to a first embodiment of the present invention is shown in FIG. 1 to FIG. 18. First, an overall configuration of the tripod type constant velocity universal joint according to this embodiment is described with reference to FIG. 1 to FIG. 6. FIG. 1 is a longitudinal sectional view for illustrating the tripod type constant velocity universal joint according to this embodiment. FIG. 2 is a cross-sectional view taken along the line A-A of FIG. 1 and seen in the direction indicated by the arrows. However, in FIG. 2, a tripod member 3 and two lower roller units 4 are not illustrated in a cross-sectional manner, and an illustration of a shaft 9 is omitted. FIG. 3 is a plan view for illustrating a roller unit and a leg shaft seen in the direction indicated by the arrows of the line B-B of FIG. 1. FIG. 4 is a longitudinal sectional view for illustrating the roller unit taken along the line E-E of FIG. 3. FIG. 5 is a longitudinal sectional view for illustrating a state in which the tripod type constant velocity universal joint of FIG. 1 takes a normal operating angle. FIG. 6 is a longitudinal sectional view for illustrating a state in which the tripod type constant velocity universal joint of FIG. 1 takes an operating angle larger than the normal operating angle.

As illustrated in FIG. 1 and FIG. 2, a tripod type constant velocity universal joint 1 comprises, as main components, an outer joint member 2, the tripod member 3 serving as an inner joint member, and the roller units 4 serving as torque transmission members. The outer joint member 2 is formed into a cup shape that is opened at one end, and has an inner peripheral surface having three linear track grooves 5 equiangularly formed therein so as to extend in an axial direction. On both sides of each of the track grooves 5, there are formed roller guide surfaces 6 arranged to face each other in a circumferential direction and each extending in the axial direction. The outer joint member 2 receives therein the tripod member 3 and the roller units 4.

The tripod member 3 comprises three leg shafts 7 projecting in a radial direction. A shaft 9 is spline-fitted to a center hole 8 of the tripod member 3, and fixed in the axial direction with a stopper ring 10. The roller units 4 each comprise, as main components, a roller 11, an inner ring 12 arranged inside the roller 11 and externally fitted to the leg shaft 7, and a plurality of needle rollers 13 interposed between the roller 11 and the inner ring 12. The roller units 4 are received in the track grooves 5 of the outer joint member 2, respectively, and a center of each roller unit 4 (or the roller 11) in a width direction thereof is located on a pitch circle PC of the track grooves 5.

As illustrated in FIG. 4, the needle rollers 13 are arranged between a cylindrical inner peripheral surface 11b of the roller 11 and a cylindrical outer peripheral surface 12b of the inner ring 12 without a cage in a so-called full type. The cylindrical inner peripheral surface 11b of the roller 11 serves as an outer raceway surface, and the cylindrical outer peripheral surface 12b of the inner ring 12 serves as an inner raceway surface. An inner peripheral surface 12a of the inner ring 12 is formed of an arc-shaped protruding surface in a longitudinal section containing an axis of the inner ring 12. The arc-shaped protruding surface has a curvature radius "ri" of, for example, about 30 mm in order to allow inclination of the leg shaft 7 with respect to the inner ring 12 by from about 2° to about 3° due to whirling peculiar to a tripod type constant velocity universal joint.

An outer peripheral surface 11a of the roller 11 is formed of a partially spherical surface having a curvature radius "r" and having a curvature center on an axis 4x of the roller unit 4, in other words, an axis 7x of the leg shaft 7 illustrated in FIG. 3. The roller unit 4, which comprises the inner ring 12, the needle rollers 13, and the roller 11 of the roller unit 4, has an inseparable structure owing to washers 14 and 15. Each of the washers 14 and 15 is slitted at one portion in the circumferential direction (see FIG. 3), and is fitted into an annular groove of the cylindrical inner peripheral surface 11b of the roller 11 under a state in which each of the washers 14 and 15 is elastically reduced in diameter.

As illustrated in FIG. 1 and FIG. 2, an outer peripheral surface 7a of each of the leg shafts 7 of the tripod member 3 has a straight shape in a longitudinal section containing the axis 7x of the leg shaft 7 (see FIG. 3). Further, as illustrated in FIG. 3, the outer peripheral surface 7a of each of the leg shafts 7 has a substantially elliptic shape in a cross section orthogonal to the axis 7x of the leg shaft 7. The outer peripheral surface 7a is brought into contact with the inner peripheral surface 12a of the inner ring 12 in a direction orthogonal to an axis of the joint, that is, a direction of a major axis "a", and defines a gap "m" together with the inner peripheral surface 12a of the inner ring 12 in a direction of the axis of the joint, that is, a direction of a minor axis "b". In the tripod type constant velocity universal joint 1, the roller 11 of the roller unit 4 fitted to each of the leg shafts 7 of the tripod member 3 rolls on the roller guide surfaces 6 of each of the track grooves 5 of the outer joint member 2.

A cross section of each of the leg shafts 7 has a substantially elliptic shape. Thus, at a relatively small operating angle at which the joint is in normal use, as illustrated in FIG. 5, an axis of the tripod member 3 is inclined with respect to an axis of the outer joint member 2. However, the roller unit 4 can be inclined with respect to the axis of each of the leg shafts 7 of the tripod member 3. Accordingly, the roller 11 of each of the roller units 4 and the roller guide surfaces 6 are prevented from being brought into an oblique state, and the roller 11 rolls properly. Thus, induced thrust and sliding resistance can be reduced, and reduction in vibration of the joint can be achieved. In this specification and Claims, the substantially elliptic shape is not limited to an elliptic shape that is expressed literally. The substantially elliptic shape includes shapes that are generally referred to as, for example, an egg shape and an oval shape.

The leg shaft 7 having the substantially elliptic cross section and the inner ring 12 comprising the circular inner peripheral surface 12a are brought into contact with each other, and thus torque is transmitted. Accordingly, in order to relax a contact pressure on a contact portion between the leg shaft 7 and the inner ring 12 and to secure strength of the leg shaft 7, an ellipticity b/a of the leg shaft 7 between the major axis "a" and the minor axis "b" of the substantially elliptic shape and the curvature radius "ri" of the inner peripheral surface 12a of the inner ring 12 (see FIG. 4) are set. Thus, at a relatively small operating angle at which the joint is in normal use, as described above with reference to FIG. 5, the roller unit 4 can be inclined with respect to each of the leg shafts 7, and hence the roller 11 of the roller unit 4 can roll without being oblique to the roller guide surfaces 6.

Meanwhile, when an operating angle is larger than a predetermined angle (for example, about 15°) exceeding the normal operating angle, the outer peripheral surface 7a of the leg shaft 7 and the inner peripheral surface 12a of the inner ring 12, which are illustrated in FIG. 3, interfere with each other, with the result that the roller unit 4 (or the roller 11) cannot be further inclined with respect to the leg shaft 7. There is a limitation on an angle by which the roller unit 4 can be inclined with respect to the leg shaft 7. Accordingly, when an operating angle is larger than the predetermined angle exceeding the normal operating angle, it is required that the roller unit 4 be inclined with respect to the track groove 5 by an angle corresponding to an inclination shortage. However, as illustrated in FIG. 4, the outer peripheral surface 11a of the roller 11 is formed of the partially spherical surface having the curvature radius "r" and having the curvature center on the axis 7x of the leg shaft 7. Thus, as illustrated in FIG. 6, the roller unit 4 can be inclined in the track groove 5, and hence the joint can also cope with a large operating angle.

The overall configuration of the tripod type constant velocity universal joint 1 according to this embodiment is described above. Next, characteristic configurations are described. The characteristic configurations are described in the following items (1) to (3).

(1) The outer peripheral surface 11a of the roller 11 is formed of the partially spherical surface having the curvature center on the axis 7x of the leg shaft 7.

(2) The roller guide surface 6 is formed of a partially cylindrical surface having a curvature center on a horizontal line passing an intersection of the pitch circle PC of the track grooves 5 and a center line of the track groove 5.

(3) Under a state in which no torque is applied to the joint, an end portion of the outer peripheral surface 11a of the roller 11 is held in abutment against the roller guide surfaces 6.

Figure 7A:
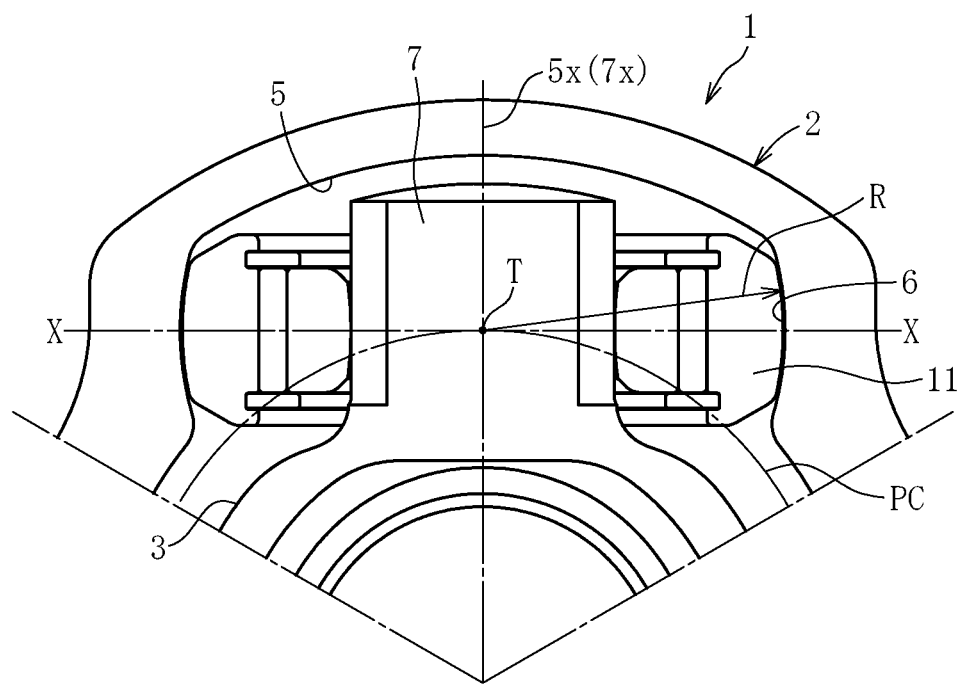
FIG. 7a is a cross-sectional view of one third of the joint illustrated on the upper side of FIG. 2, for illustrating a curvature radius of a partially cylindrical surface of a roller guide surface.
Figure 7B:
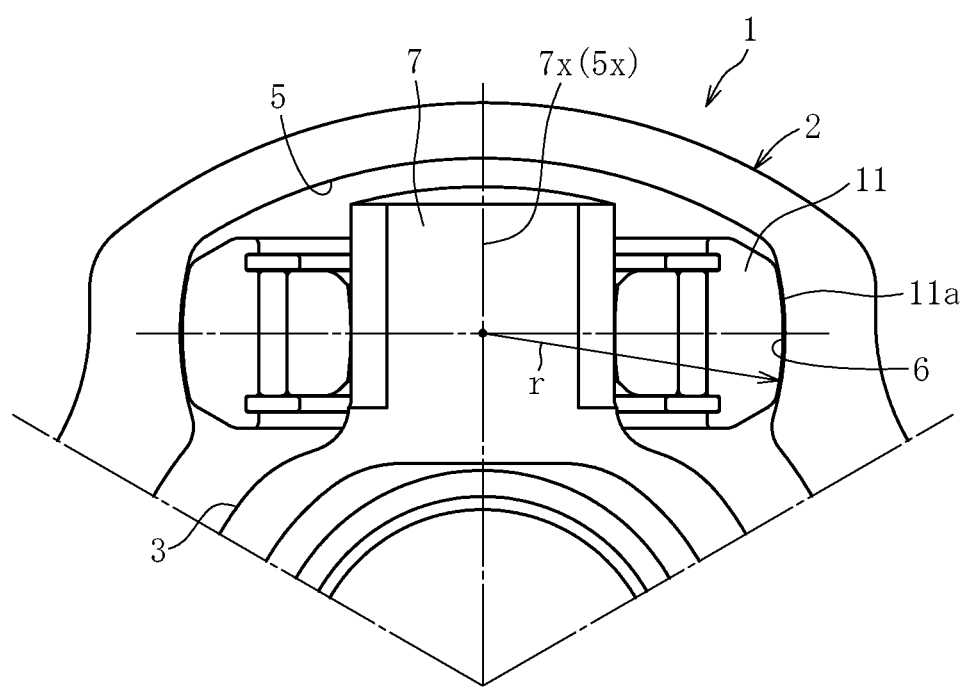
FIG. 7b is a cross-sectional view of the one third of the joint illustrated on the upper side of FIG. 2, for illustrating a curvature radius of a partially spherical surface of an outer peripheral surface of the roller.
Figure 8:
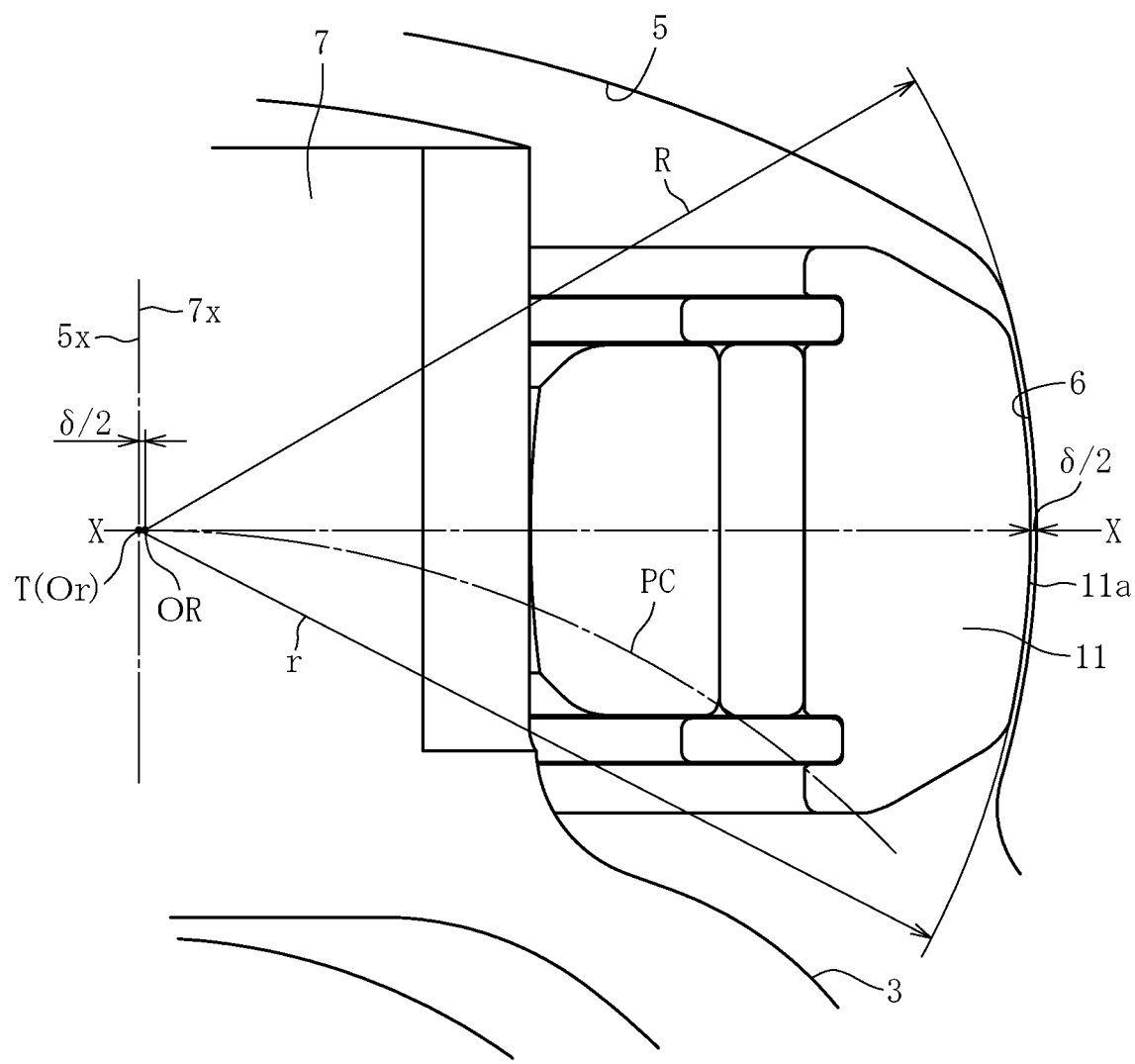
FIG. 8 is a cross-sectional view for illustrating a portion D of FIG. 2 in an enlarged manner.

The characteristic configurations (1) and (2) are specifically described with reference to FIG. 7a, FIG. 7b, and FIG. 8. FIG. 7a is a cross-sectional view of one third of the joint illustrated on the upper side of FIG. 2, for illustrating a curvature radius of the partially cylindrical surface of the roller guide surface. FIG. 7b is a cross-sectional view of the one third of the joint illustrated on the upper side of FIG. 2, for illustrating a curvature radius of the partially spherical surface of the outer peripheral surface of the roller. FIG. 8 is a cross-sectional view for illustrating a portion D of FIG. 2 in an enlarged manner. In FIG. 7a, FIG. 7b, and FIG. 8, hatching illustrating a sectional portion is omitted.

FIG. 7a, FIG. 7b, and FIG. 8 are each an illustration of a state in which a center line 5x of the track groove 5 and the axis 7x of the leg shaft 7 match each other. As illustrated in FIG. 7b, the outer peripheral surface 11a of the roller 11 is formed of the partially spherical surface having the curvature radius "r" and having a curvature center Or on the axis 7x of the leg shaft 7 (see FIG. 8). As illustrated in FIG. 7a, the roller guide surface 6 is formed of the partially cylindrical surface having a curvature radius R and having a curvature center on a horizontal line X-X passing an intersection T of the pitch circle PC of the track grooves 5 and the center line 5*x* of the track groove 5, and extends in parallel to the axis of the joint. In this embodiment, the roller guide surface 6 has the curvature radius R so as to have a shape along the curvature radius "r" of the outer peripheral surface 11*a* of the roller 11. That is, the curvature radius R of the partially cylindrical surface of the roller guide surface 6 and the curvature radius "r" of the partially spherical surface of the outer peripheral surface 11*a* of the roller 11 satisfy a relation of R=r, and satisfy a contact ratio R/r=1.00.

With reference to FIG. 8, a relationship between the outer peripheral surface 11*a* of the roller 11 and the roller guide surface 6 of the track groove 5 is further described in detail. Under a state in which the center line 5*x* of the track groove 5 and the axis 7*x* of the leg shaft 7 are matched with each other, a gap δ/2 is defined between the outer peripheral surface 11*a* of the roller 11, which is formed of the partially spherical surface having the curvature radius "r", and the roller guide surface 6, which is formed of the partially cylindrical surface having the curvature radius R. In this embodiment, the curvature radii "r" and R are set to satisfy the relation of R=r (or satisfy the contact ratio R/r=1.00). Thus, the curvature center Or of the partially cylindrical surface of the roller guide surface 6 having the curvature radius R is shifted by the gap δ/2 from the center line 5*x* of the track groove 5 on the horizontal line X-X.

When a left half of the outer peripheral surface 11*a* of the roller 11, which is not shown in FIG. 8, is pressed onto the roller guide surface 6, the gap δ/2 between a right half of the outer peripheral surface 11*a* of the roller 11 and the roller guide surface 6 is doubled to be a gap δ (see FIG. 9), and the gap δ is referred to as "track gap". The track gap δ has a small value of, for example, from about several tens of μm to about a hundred and several tens of μm.

The characteristic configurations (1) and (2) of the tripod type constant velocity universal joint 1 according to this embodiment are as described above: (1) the outer peripheral surface 11*a* of the roller 11 is formed of the partially spherical surface having the curvature center on the axis 7*x* of the leg shaft 7; and (2) the roller guide surface 6 is formed of the partially cylindrical surface having the curvature center on the horizontal line X-X passing the intersection T of the pitch circle PC of the track grooves 5 and the center line 5*x* of the track groove 5.

Figure 9:
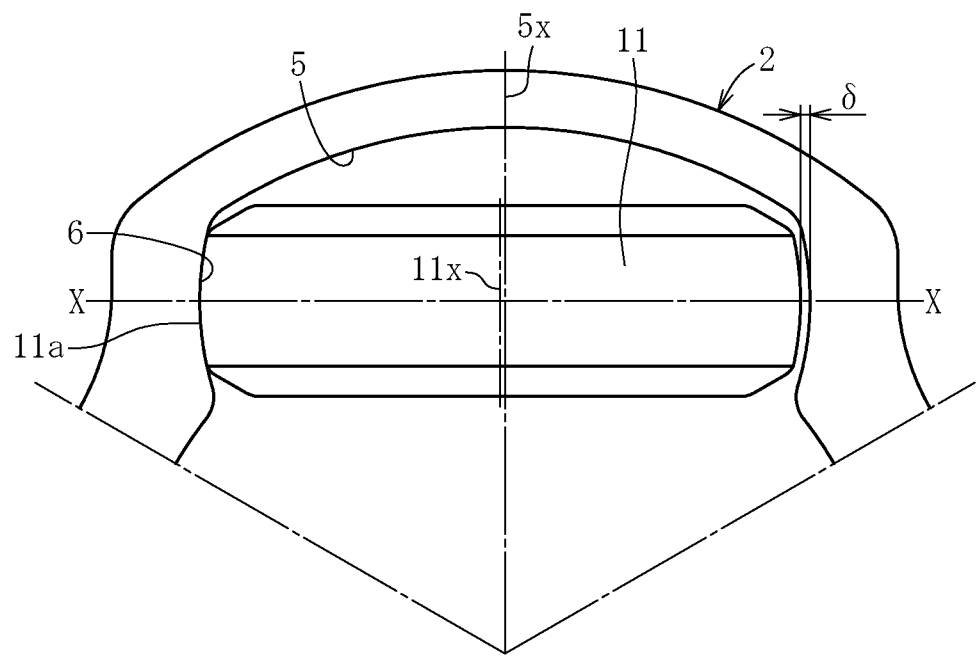
FIG. 9 is a schematic view for illustrating a state of the roller and the roller guide surfaces during torque transmission.
Figure 10:
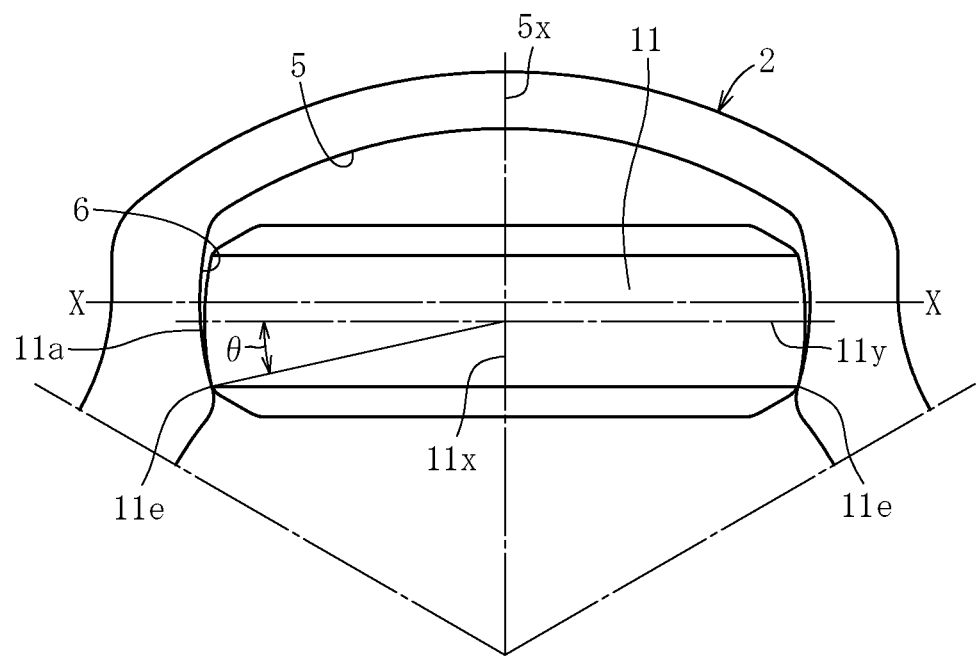
FIG. 10 is a schematic view for illustrating a state of the roller and the roller guide surfaces under application of no torque.

Next, with reference to FIG. 9 to FIG. 13, the characteristic configuration (3) of the tripod type constant velocity universal joint 1 according to this embodiment is described: (3) under a state in which no torque is applied to the joint, the end portion of the outer peripheral surface 11*a* of the roller 11 is held in abutment against the roller guide surfaces 6. FIG. 9 is a schematic view for illustrating a state of the roller and the roller guide surfaces during torque transmission. FIG. 10 is a schematic view for illustrating the roller and the roller guide surfaces under application of no torque.

As illustrated in FIG. 9, when torque is applied to the tripod member 3 (see FIG. 2) in a counterclockwise direction, the outer peripheral surface 11*a* of the roller 11 is brought into abutment against the roller guide surface 6 illustrated on the left side of FIG. 9, and thus the roller guide surface 6 bears a load. However, the track gap δ is defined between the roller guide surface 6 illustrated on the right side of FIG. 9 and the outer peripheral surface 11*a* of the roller 11, and hence the roller 11 smoothly rolls on the roller guide surfaces 6. In accordance with the track gap δ, the axis 11*x* of the roller 11 is slightly shifted from the center line 5*x* of the track groove 5 in a direction of the horizontal line X-X. In FIG. 9 and FIG. 10, for easier understanding, the track gap δ is illustrated in an exaggerated manner.

Meanwhile, as illustrated in FIG. 10, under a state in which no torque is applied to the joint, the roller 11 is not restrained by the roller guide surfaces 6, and hence can be moved to both of an upper side and a lower side of the roller 11 with respect to a radial direction thereof. As a result, the outer peripheral surface 11*a* of the roller 11 is brought into contact with the roller guide surfaces 6 on both sides of the roller 11 in a diameter direction thereof. FIG. 10 is an illustration of a state in which the roller 11 is moved to the lower side, and a center line 11*y* of the roller 11 in a width direction thereof is shifted to the lower side from the horizontal line X-X of the track groove 5.

In this embodiment, the contact ratio of the curvature radius R of the partially cylindrical surface of the roller guide surface 6 to the curvature radius "r" of the partially spherical surface of the outer peripheral surface 11*a* of the roller 11 is set to satisfy R/r=1.00, and thus an end portion 11*e* of the outer peripheral surface 11*a* of the roller 11 is brought into abutment against the roller guide surfaces 6. With this configuration, a contact angle θ between the outer peripheral surface 11*a* of the roller 11 and each roller guide surface 6 is increased, and the roller 11 can smoothly slide on the roller guide surfaces 6 under application of no torque. Details of the following are described later: a relationship of the contact angle θ between the outer peripheral surface 11*a* of the roller 11 and each roller guide surface 6 under application of no torque, to a sliding characteristic of the roller 11 on the roller guide surfaces 6; and a practicable range of the contact ratio R/r.

FIG. 10 is an illustration of a state in which the center line 5*x* of the track groove 5 and the axis 11*x* of the roller 11 overlap each other when the roller 11 in a horizontal posture is shifted to the lower side, but the roller 11 may be in an oblique posture in other cases. Further, FIG. 10 is an illustration of a case in which the roller 11 is moved to the lower side, but the same holds true in a case in which the roller 11 is moved to the upper side. Moreover, in FIG. 10, the track gap δ is illustrated in an exaggerated manner, and hence a shift amount of the center line 11*y* of the roller 11 in the width direction from the horizontal line X-X of the track groove 5 is illustrated in a size larger than the actual size.

The characteristic configuration (3) of the tripod type constant velocity universal joint 1 according to this embodiment is as described above: (3) under a state in which no torque is applied to the joint, the end portion 11*e* of the outer peripheral surface 11*a* of the roller 11 is held in abutment against the roller guide surfaces 6.

Figure 11:
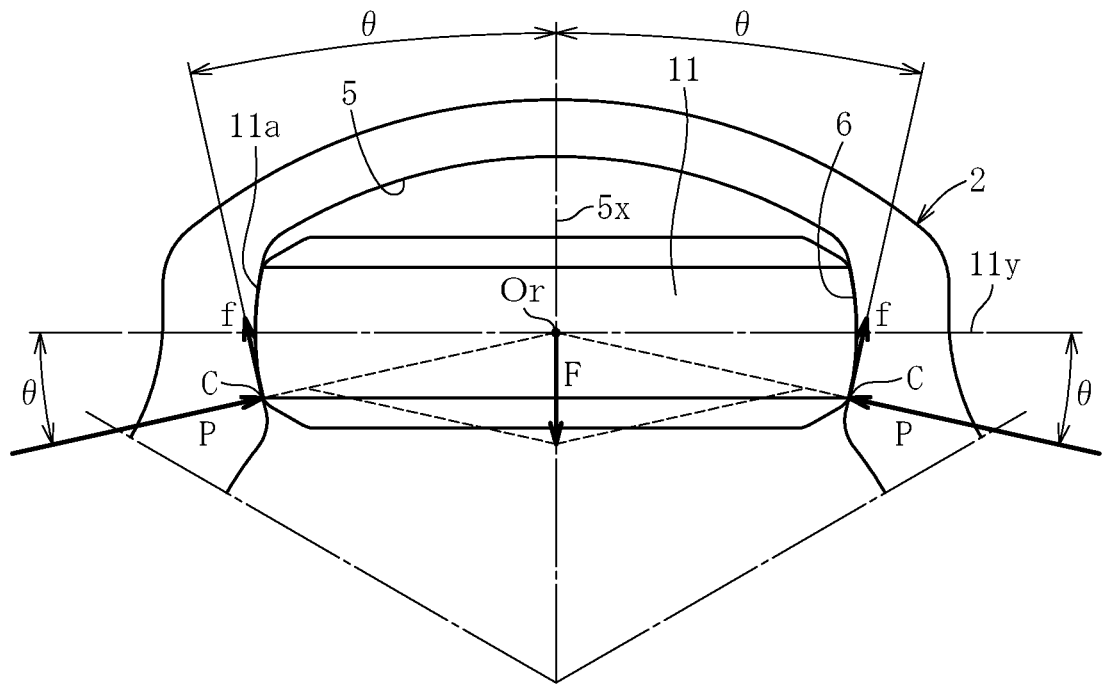
FIG. 11 is a schematic view for illustrating a relationship among a load, a contact angle, and a frictional force between the roller and each roller guide surface under application of no torque.
Figure 12:
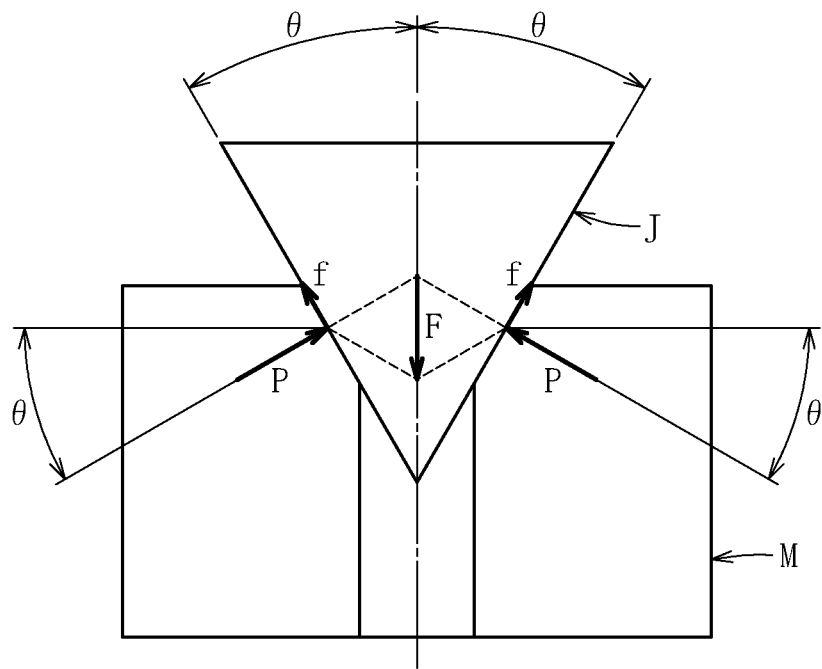
FIG. 12 is a view for illustrating the roller modeled in terms of a wedge effect.
Figure 13:
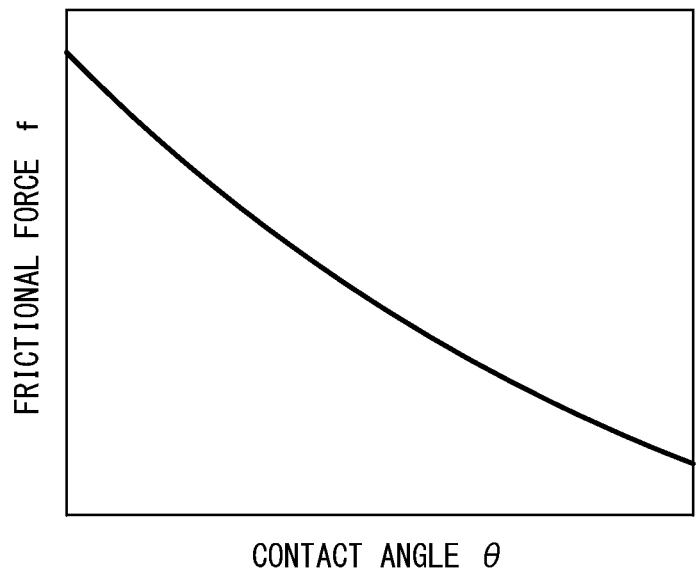
FIG. 13 is a graph for showing a relationship between a contact angle θ and a frictional force "f".

With reference to FIG. 11 to FIG. 13, description is made of the relationship of the contact angle θ between the outer peripheral surface 11*a* of the roller 11 and each roller guide surface 6 under application of no torque, to the sliding characteristic of the roller 11 on the roller guide surface 6. FIG. 11 is a schematic view for illustrating a relationship among a load, the contact angle, and a frictional force between the roller and each roller guide surface under application of no torque. FIG. 12 is a view for illustrating the roller modeled in terms of a wedge effect. FIG. 13 is a graph for showing a relationship between the contact angle θ and a frictional force "f".

As illustrated in FIG. 11, when the roller 11 is moved to the lower side with respect to the roller guide surfaces 6, the frictional force "f" is generated between the outer peripheral surface 11*a* of the roller 11 and each roller guide surface 6.

The frictional force "f" becomes a factor that hinders smooth sliding of the roller 11 under application of no torque. In FIG. 11, F represents a load applied from the roller 11, P represents a normal load on the roller guide surface 6, θ represents the contact angle formed between a straight line connecting a center Or of the roller 11 and a contact point C on the roller guide surface 6 to each other, and a horizontal line 11y (which is also a center line of the roller 11 in the width direction) passing the center Or of the roller 11, and "f" represents the frictional force on the roller guide surface 6. In addition to a case in which the frictional force "f" is applied to the drawing sheet of FIG. 11 as illustrated in FIG. 11, in a case in which a drive shaft assembly comprising the tripod type constant velocity universal joint 1 mounted to one end thereof is assembled to a vehicle, the frictional force "f" is applied in the axial direction of the roller guide surface 6. However, in order to simplify the relationship among the load, the contact angle, and other factors, the frictional force "f" is illustrated on the drawing sheet of FIG. 11 for convenience.

In order to illustrate the frictional force "f" generated between the outer peripheral surface 11a of the roller 11 and the roller guide surface 6 illustrated in FIG. 11, in FIG. 12, there is exemplified a model in a case in which a wedge J is driven into an object M. The wedge J corresponds to the roller 11. Here, F represents the load, P represents the normal load, θ represents the contact angle, "f" represents the frictional force, and μ represents a coefficient of friction. A wedge angle is expressed by 2×contact angle θ. Based on balance of forces, a relationship between the contact angle θ and the frictional force "f" is expressed by the following expression.

$$f = \frac{\mu \cdot F}{2(\sin\theta + \mu \cdot \cos\theta)}$$

FIG. 13 is a graph for showing the relationship between the contact angle θ and the frictional force "f". As the contact angle θ becomes larger, the frictional force "f" becomes smaller. Accordingly, it was confirmed that the roller 11 can slide smoothly when the contact angle θ is increased and the frictional force "f" is reduced.

Figure 14:
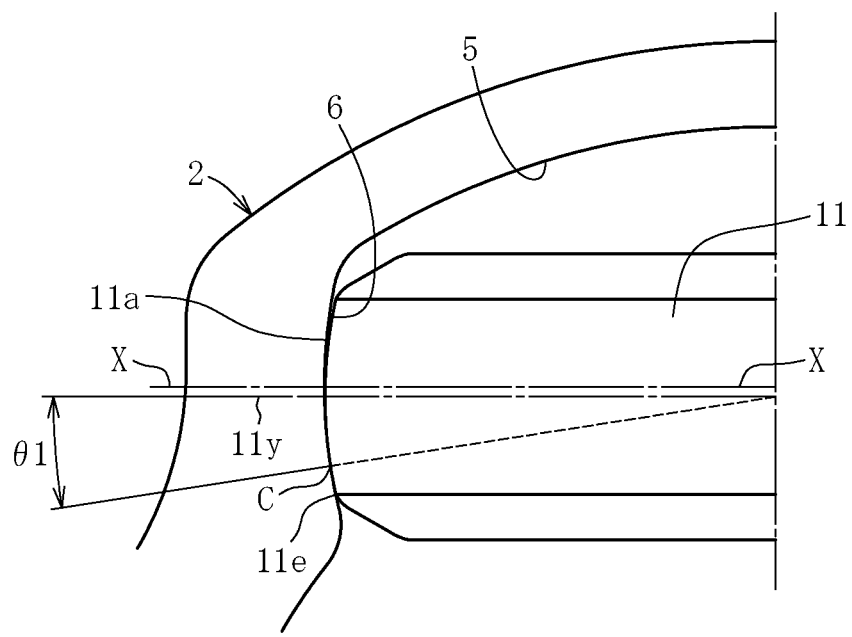
FIG. 14 is a schematic view for illustrating a relationship between a contact ratio R/r and a contact angle θ1.
Figure 15:
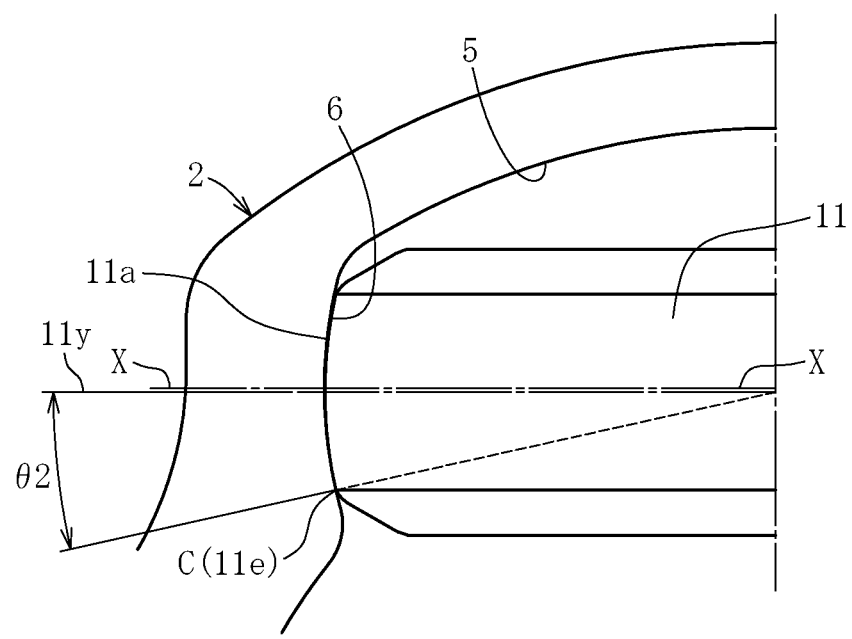
FIG. 15 is a schematic view for illustrating a relationship between the contact ratio R/r and a contact angle θ2.
Figure 16:
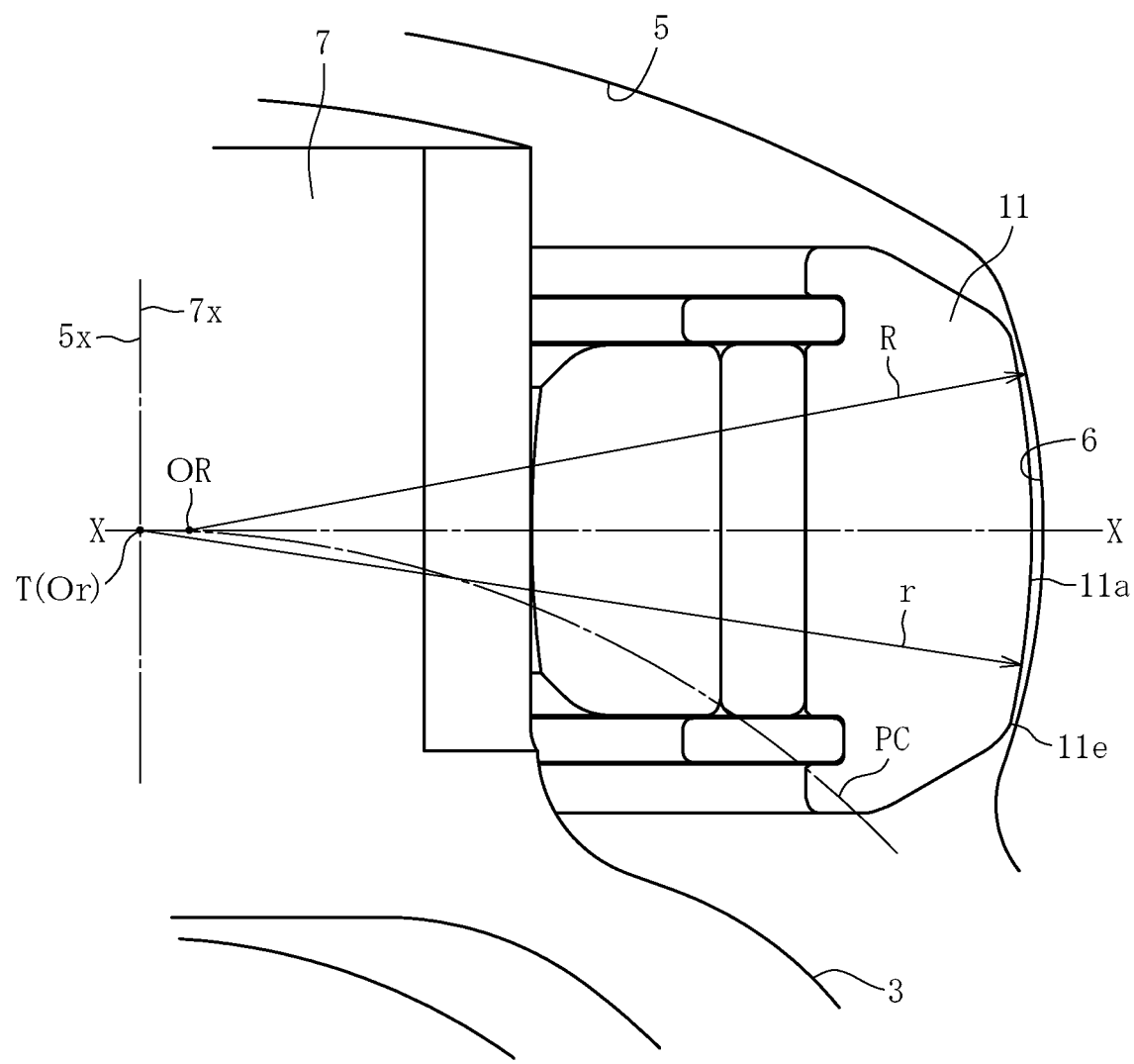
FIG. 16 is a cross-sectional view for illustrating a case in which the contact ratio R/r is different from that in FIG. 8.
Figure 17:
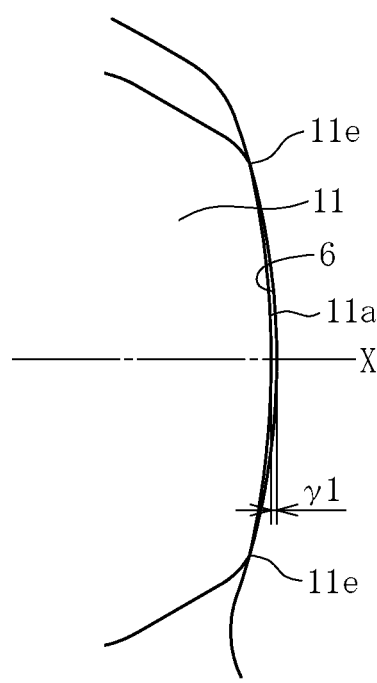
FIG. 17 is a partial cross-sectional view for illustrating a state in which the outer peripheral surface of the roller and the roller guide surface illustrated in FIG. 16 are held in contact with each other.
Figure 18:
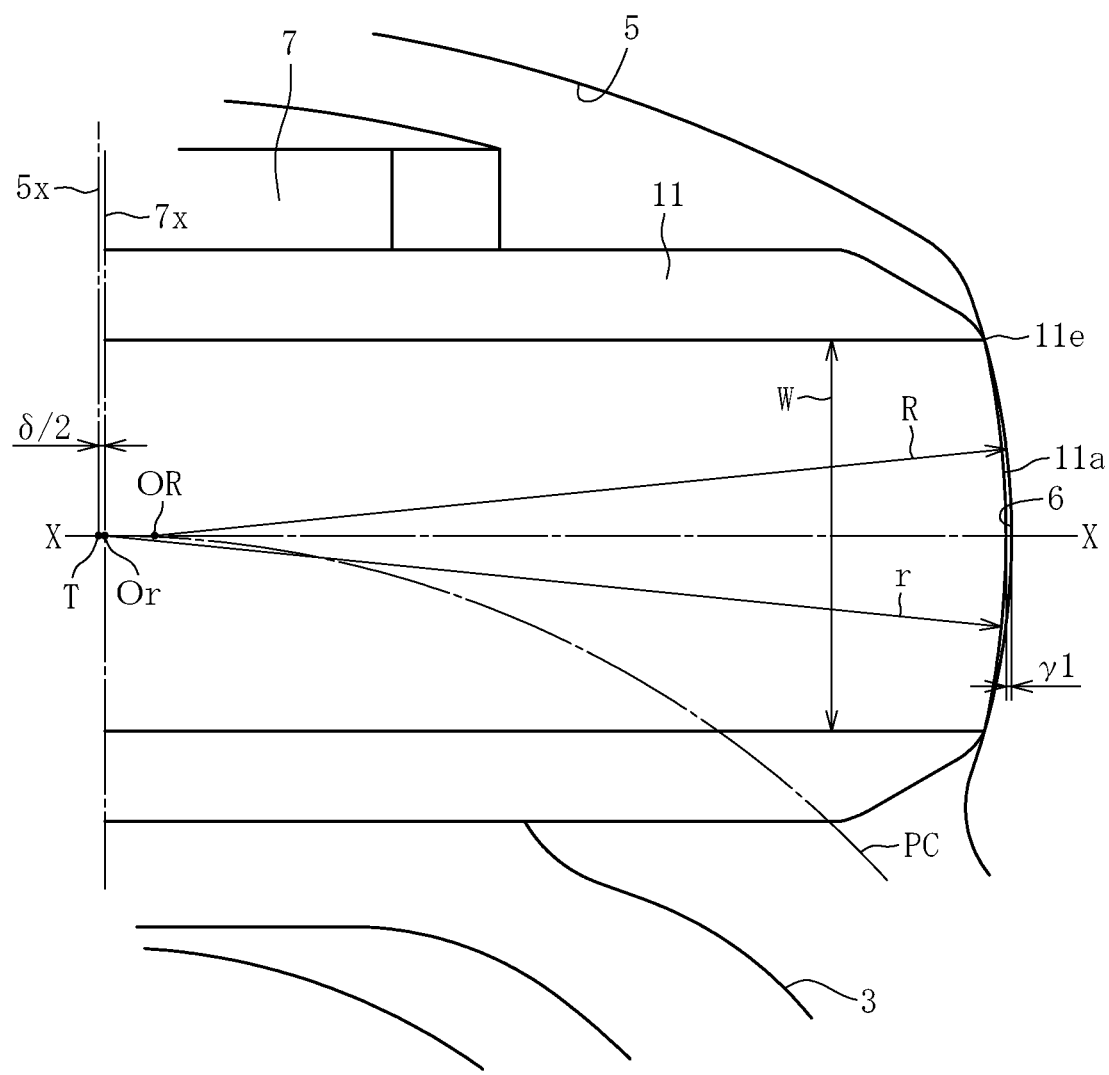
FIG. 18 is a cross-sectional view for additionally illustrating a center line of a track groove and an axis of the leg shaft under a state in which the outer peripheral surface of the roller and the roller guide surface illustrated in FIG. 17 are held in contact with each other.

Based on the above-mentioned finding, a study was made on the contact angle θ capable of achieving a satisfactory sliding characteristic of the roller 11 under application of no torque, and a study was made on a relationship between the contact angle θ and the contact ratio R/r. The results of the studies are described with reference to FIG. 14 to FIG. 18. FIG. 14 is a schematic view for illustrating a relationship between the contact ratio R/r and a contact angle θ1. FIG. 15 is a schematic view for illustrating a relationship between the contact ratio R/r and a contact angle θ2. FIG. 16 is a cross-sectional view for illustrating a case in which the contact ratio R/r is different from that in FIG. 8. FIG. 17 is a partial cross-sectional view for illustrating a state in which the outer peripheral surface of the roller and the roller guide surface illustrated in FIG. 16 are held in contact with each other. FIG. 18 is a cross-sectional view for additionally illustrating the center line of the track groove and the axis of the leg shaft under a state in which the outer peripheral surface of the roller and the roller guide surface illustrated in FIG. 17 are held in contact with each other. However, in FIG. 18, the roller and the tripod member are illustrated as not a cross-sectional view but a side view.

FIG. 14 is an illustration of an example of a case of the contact ratio R/r>1.08. As the contact ratio R/r becomes larger than 1, the contact angle θ1 under application of no torque becomes smaller. As illustrated in FIG. 14, the center line 11y of the roller 11 in the width direction is significantly shifted to the lower side from the horizontal line X-X of the track groove 5, and the contact point C between the outer peripheral surface 11a of the roller 11 and the roller guide surface 6 is separated away from the end portion 11e of the outer peripheral surface 11a of the roller 11 and located closer to a center of the roller 11. As a result of tests and design studies, it was confirmed that, when the contact ratio R/r exceeds 1.08 (R/r>1.08), smooth sliding of the roller 11 under application of no torque is hindered so that a problem may arise in practical use. Accordingly, it is desired that the contact ratio satisfy R/r≤1.08. In FIG. 14 to FIG. 16, the track gap δ is also illustrated in a slightly exaggerated manner.

FIG. 15 is an illustration of a case of the contact ratio R/r=1.00. As illustrated in FIG. 15, the center line 11y of the roller 11 in the width direction is shifted from the horizontal line X-X of the track grooves 5 by a small amount, and the contact point C between the outer peripheral surface 11a of the roller 11 and the roller guide surface 6 is located at the end portion 11e of the outer peripheral surface 11a of the roller 11. The contact angle θ2 under application of no torque is increased, and thus the roller 11 can smoothly slide under application of no torque.

FIG. 16 and FIG. 17 are each an illustration of an example of a case of the contact ratio R/r<1.00. Although not shown, in this case, similarly to FIG. 15, under application of no torque, the end portion 11e of the outer peripheral surface 11a of the roller 11 is held in abutment against the roller guide surface 6. Thus, the contact angle θ can be set to a large angle, and hence the roller 11 can smoothly slide under application of no torque.

In the case of the contact ratio R/r<1.00, when the roller 11 is pressed onto the roller guide surface 6 as illustrated in FIG. 17, both end portions 11e of the outer peripheral surface 11a of the roller 11 are brought into abutment against the roller guide surface 6. Under a state in which the both end portions 11e of the outer peripheral surface 11a of the roller 11 are held in abutment against the roller guide surface 6, as illustrated in FIG. 18, the axis 7x of the leg shaft 7 is shifted by a half of the track gap δ with respect to the center line 5x of the track groove 5. During torque transmission, an entire region of a width W of the outer peripheral surface 11a of the roller 11, which includes a portion with a gap γ1 defined closer to the center of the roller 11 illustrated in FIG. 17 and FIG. 18, is held in contact with the roller guide surface 6, with the result that the contact pressure is liable to be high particularly in the end portions 11e of the outer peripheral surface 11a of the roller 11. As a result of tests and design studies, in a range of the contact ratio R/r<1.00, the contact ratio R/r≥0.95 is desired in order to suppress extreme increase in contact pressure at the end portions 11e of the outer peripheral surface 11a of the roller 11 and ensure durability of the roller guide surface 6. FIG. 16 to FIG. 18 are each an illustration of a case in which the contact ratio R/r is set to be equal to 0.95. In this case, as illustrated in FIG. 16, in accordance with an amount of reduction in curvature radius R, the shift amount of the curvature center Or of the curvature radius R from the intersection T on the horizontal line X-X (which is also the center Or of the roller 11) is increased as compared to that in FIG. 8. For easier understanding, in FIG. 16 and FIG. 18, a curved state of the partially cylindrical surface is illustrated in an emphasized size as compared to the curvature radius R of the partially cylindrical surface of the roller guide surface 6 having the curvature center OR.

Accordingly, it is desired that, as an advantageous configuration of the present invention, the contact ratio R/r of the curvature radius R of the partially cylindrical surface of the roller guide surface 6 to the curvature radius "r" of the partially spherical surface of the outer peripheral surface 11a of the roller 11 be set to satisfy $0.95 \leq R/r \leq 1.08$. With this configuration, there can be achieved the tripod type constant velocity universal joint 1 having high practicality in terms of not only performance in smooth sliding of the roller 11 on the roller guide surfaces 6 under application of no torque, but also manufacture.

Figure 19:
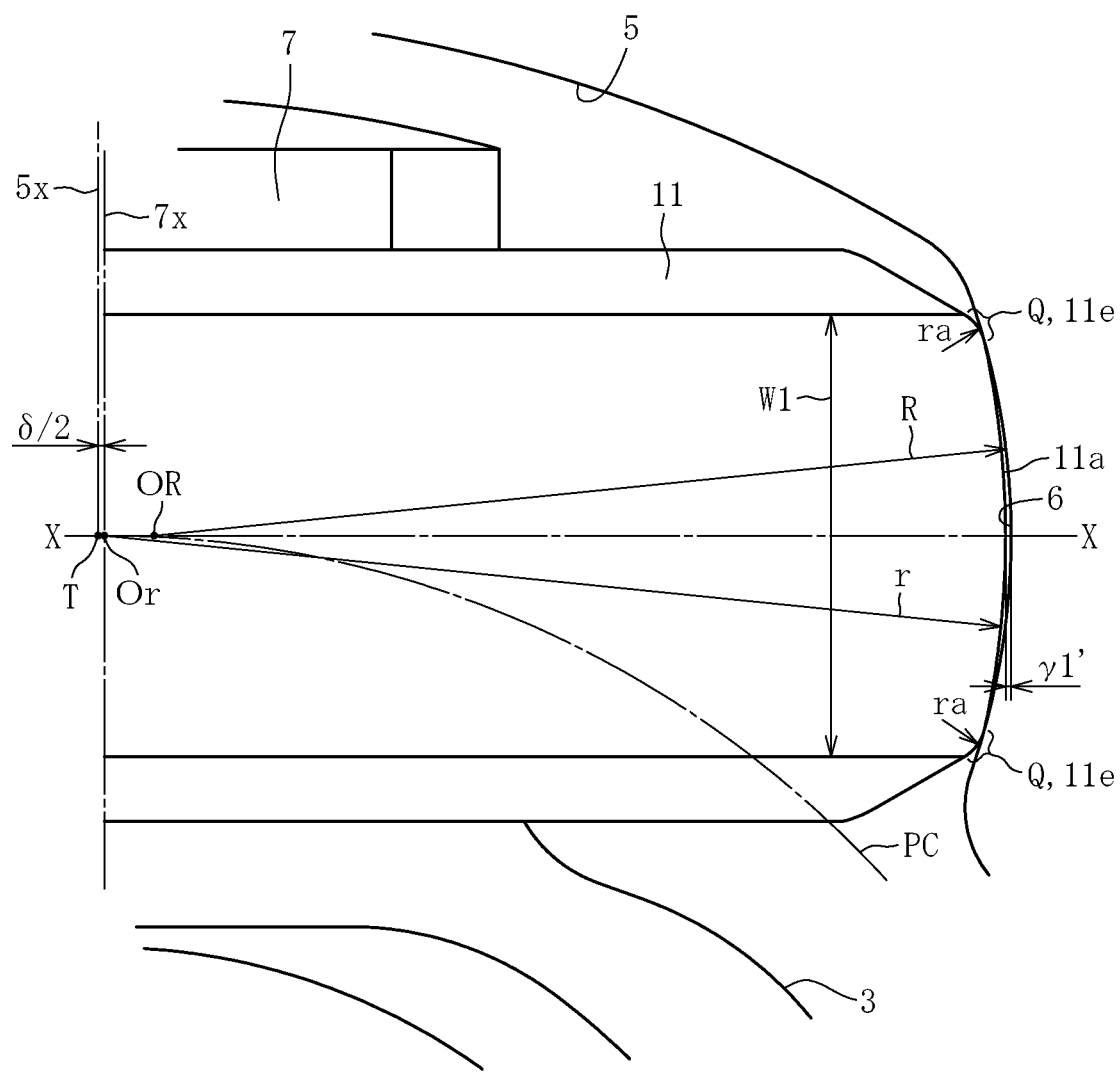
FIG. 19 is a partial cross-sectional view for illustrating a first modification example of the roller.

Next, a first modification example of the roller 11 is described with reference to FIG. 19. FIG. 19 is a partial cross-sectional view for illustrating the first modification example of the roller. In this modification example, a mode of the outer peripheral surface 11a of the roller 11 is different from that of the roller 11 described in the first embodiment and illustrated in FIG. 16 to FIG. 18. Other configurations are the same as those in the first embodiment. Accordingly, components having the same functions are denoted by the same reference symbols, and the contents described in the first embodiment are applied incorporated in this modification example. A difference in this modification example from the roller 11 in the first embodiment is described below.

In this modification example, in order to avoid the above-mentioned edge contact in the case of the contact ratio R/r<1.00, as illustrated in FIG. 19, a rounded portion having a curvature radius "ra" is formed at each end portion 11e of the outer peripheral surface 11a of the roller 11. With this configuration, a rounded portion Q having the curvature radius "ra", which is formed at each end portion 11e of the outer peripheral surface 11a of the roller 11, and the roller guide surface 6 are brought into contact with each other. Thus, an edge load can be effectively avoided, thereby leading to improvement in durability of the roller guide surface 6.

The curvature radius "r" of the partially spherical surface of the outer peripheral surface 11a of the roller 11 and the curvature radius "ra" of the rounded portion Q satisfy a relation of r>ra. In FIG. 19, a width W1 of the outer peripheral surface 11a of the roller 11 includes a region of the partially spherical surface having the curvature radius "r" and a region of the rounded portion Q having the curvature radius "ra". It is desired that the curvature radius "r" and the curvature radius "ra" be connected to each other through smoothly tangential connection. Further, in general, the width W1 of the outer peripheral surface 11a of the roller 11 is finished by grinding or hardened steel cutting work (which refers to cutting work performed after hardening). However, particularly when finishing is performed by grinding, it is desired that a region having the curvature radius "r" and a region having the curvature radius "ra" be finished integrally through use of, for example, a formed grindstone for integrally transferring the curvature radius "r" and the curvature radius "ra". In this modification example, there is exemplified a case in which the rounded portion Q having the curvature radius "ra" is formed at each end portion 11e of the outer peripheral surface 11a of the roller 11 in the case of the contact ratio R/r<1.00, but the present invention is not limited thereto. In order to avoid an inevitable edge load, the above-mentioned rounded portion Q may also be formed in the case of $1.00 \leq R/r \leq 1.08$. Also in this modification example, it is desired that the contact ratio R/r satisfy $0.95 \leq R/r \leq 1.08$.

Figure 20:
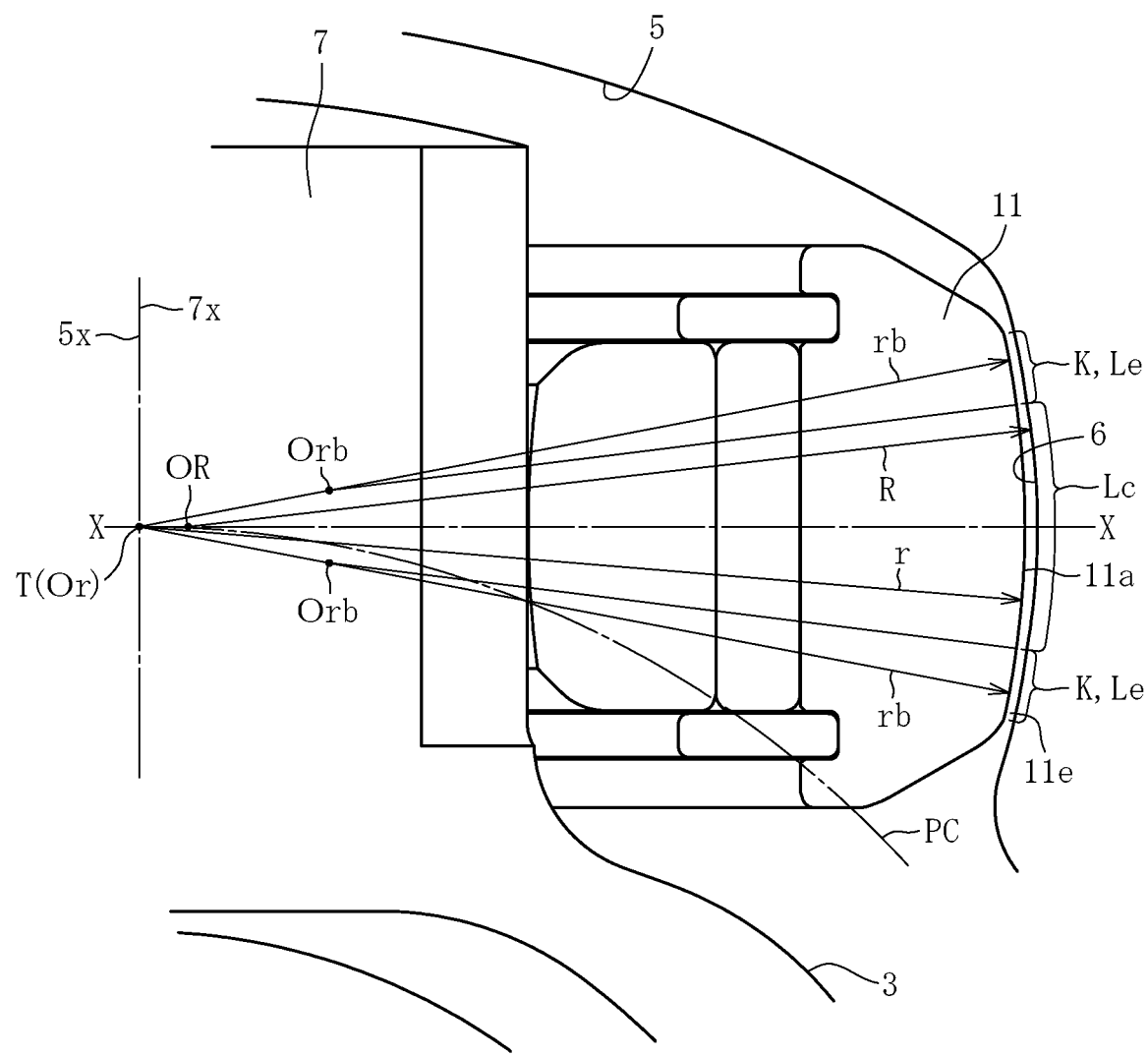
FIG. 20 is a partial cross-sectional view for illustrating a second modification example of the roller.
Figure 21:
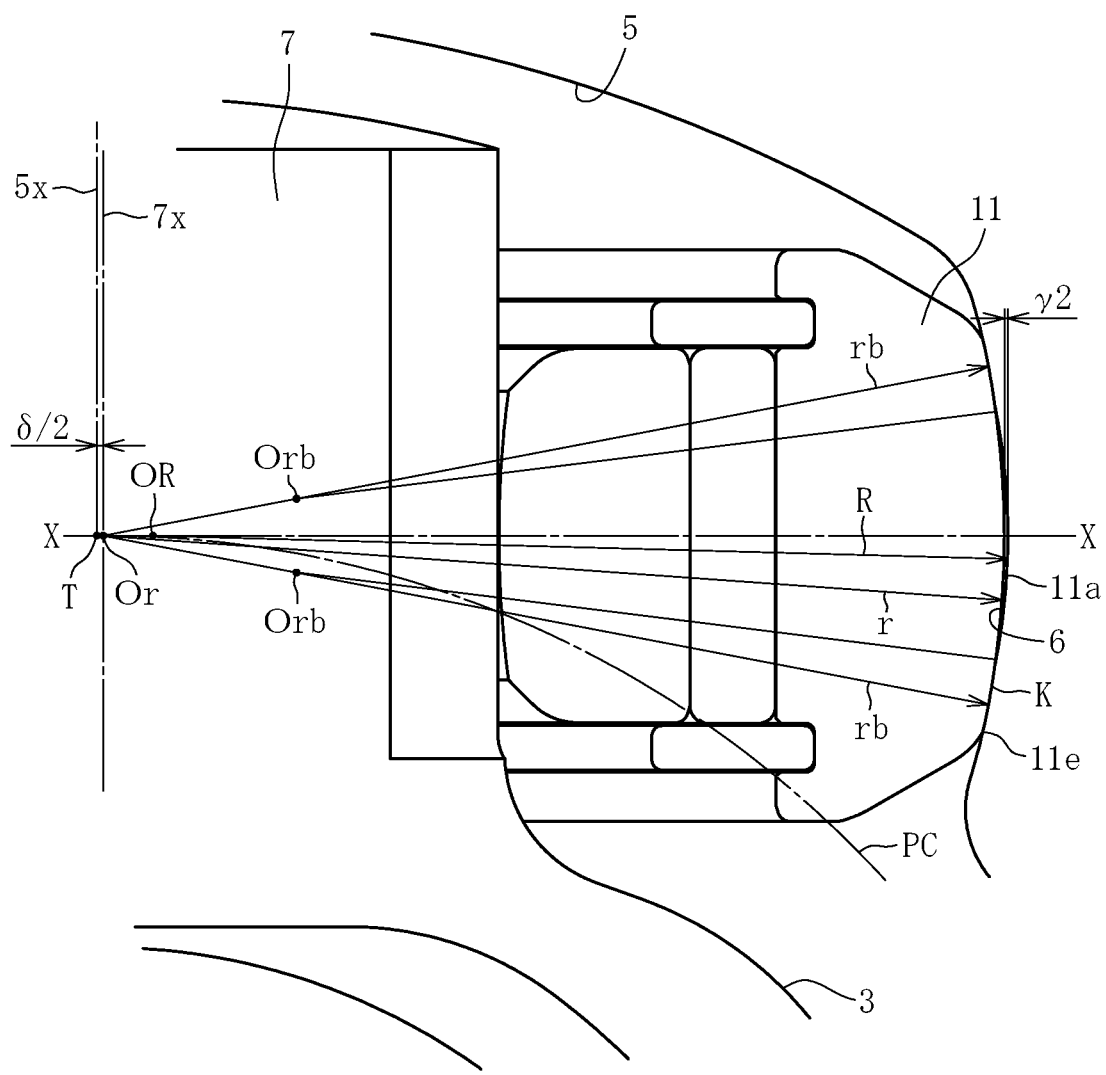
FIG. 21 is a partial cross-sectional view for illustrating a state in which the outer peripheral surface of the roller and the roller guide surface illustrated in FIG. 20 are held in contact with each other.

Moreover, a second modification example of the roller 11 is described with reference to FIG. 20 and FIG. 21. FIG. 20 is a partial cross-sectional view for illustrating the second modification example of the roller. FIG. 21 is a partial cross-sectional view for illustrating a state in which the outer peripheral surface of the roller and the roller guide surface illustrated in FIG. 20 are held in contact with each other. In the first modification example described above, the rounded portion Q having the curvature radius "ra" is formed at only each end portion 11e of the outer peripheral surface 11a of the roller 11. However, in this modification example, a partially spherical surface having the curvature radius "r" is formed in a widthwise center region of the outer peripheral surface 11a of the roller 11, and a retreat portion K having a curvature radius "rb" is formed in each region extending from the widthwise center region of the outer peripheral surface 11a of the roller 11 to the end portion 11e. This point is different from the outer peripheral surface 11a of the roller 11 in the first modification example.

Other configurations excluding the outer peripheral surface 11a of the roller 11 are the same as those in the first embodiment. Accordingly, components having the same functions are denoted by the same reference symbols, and the contents described in the first embodiment are incorporated in this modification example. A difference in this modification example from the roller 11 in the first embodiment is described below.

As illustrated in FIG. 20, a widthwise center region Lc of the outer peripheral surface 11a of the roller 11 including the horizontal line X-X is formed of the partially spherical surface having the curvature radius "r" and having the curvature center Or on the axis 7x of the leg shaft 7, and the retreat portion K having the curvature radius "rb" and having a curvature center Orb is formed in each region Le extending from the widthwise center region Lc of the outer peripheral surface 11a of the roller 11 to the end portion 11e thereof. A retreat amount of the retreat portion K with respect to the curvature radius "r" is about several tens of μm at the end portion 11e. The curvature radius "r" of the partially spherical surface having the curvature center Or on the axis 7x of the leg shaft 7, and the curvature radius "rb" of the retreat portion K having the curvature center Orb are connected to each other tangentially and smoothly.

The retreat portion K having the curvature radius "rb" is formed in each region Le extending from the widthwise center region Lc of the outer peripheral surface 11a of the roller 11 to the both end portions 11e thereof, and hence the outer peripheral surface 11a of the roller 11 has a convex shape. Accordingly, as illustrated in FIG. 21, the retreat portion K of the outer peripheral surface 11a of the roller 11 is brought into surface contact with the roller guide surface 6, and thus a gap γ2 defined closer to the center of the roller 11 is smaller than the gap γ1 in the first embodiment illustrated in FIG. 18. As a result, during torque transmission, the contact pressure is relaxed, thereby being capable of improving durability of the roller guide surface 6. In this modification example, there is exemplified a case in which the retreat portion K is formed of one region having the curvature radius "rb", but the present invention is not limited thereto. The region having the above-mentioned curvature radius "rb" may be formed of a plurality of curves having different curvature radii. Also in this modification example, it is desired that the contact ratio R/r satisfy $0.95 \leq R/r \leq 1.08$.

Next, a tripod type constant velocity universal joint according to a second embodiment of the present invention is described. Through experiments and confirmation of a practical level of a smooth sliding characteristic between the roller and the roller guide surfaces under application of no torque in the tripod type constant velocity universal joint according to the first embodiment, the tripod type constant velocity universal joint according to this embodiment has been found as technical measures for solving a new technical problem.

A summary of the above-mentioned new technical problem is first described. For example, in a drive shaft that transmits power from an engine of an automobile to a driving wheel, a plunging type constant velocity universal joint is used on a differential side (inboard side), and a tripod type constant velocity universal joint, which is one type of the plunging type constant velocity universal joints, is used in many cases. In a plunging-type tripod type constant velocity universal joint of a double roller type being a target of this embodiment, a roller unit is fitted to each of leg shafts of a tripod member. The roller unit comprises a spherical roller, an inner ring arranged inside the roller and externally fitted to the leg shaft, and a plurality of needle rollers interposed between the roller and the inner ring without a cage in a full type. When the joint transmits torque under a state of taking an operating angle, due to mutual friction between internal components, induced thrust causes repetitive axial forces during rotation. As typical NVH phenomena of automobiles involved with the induced thrust, rolling of a vehicle body during traveling is known.

In order to solve an NVH problem of automobiles, it is a key point to reduce a magnitude of the induced thrust of the joint. In general, the induced thrust of the joint tends to depend on a magnitude of the operating angle. Accordingly, when the joint is applied to the drive shaft of the automobile, such a design limitation is brought about that the operating angle cannot be increased. Accordingly, in order to increase a degree of freedom in drivetrain design of automobiles, it is required that the induced thrust be stabilized at a low level. The above-mentioned tripod type constant velocity universal joint of a double roller type has the structure in which, when the joint takes an operating angle, the roller unit can be inclined with respect to an axis of the leg shaft of the tripod member even when the axis of the tripod member is inclined with respect to an axis of an outer joint member so that the roller rolls on roller guide surfaces properly. With this structure, the tripod type constant velocity universal joint of a double roller type achieves reduction in induced thrust. However, it is an important technical object to further reduce and stabilize the induced thrust.

Figure 22:
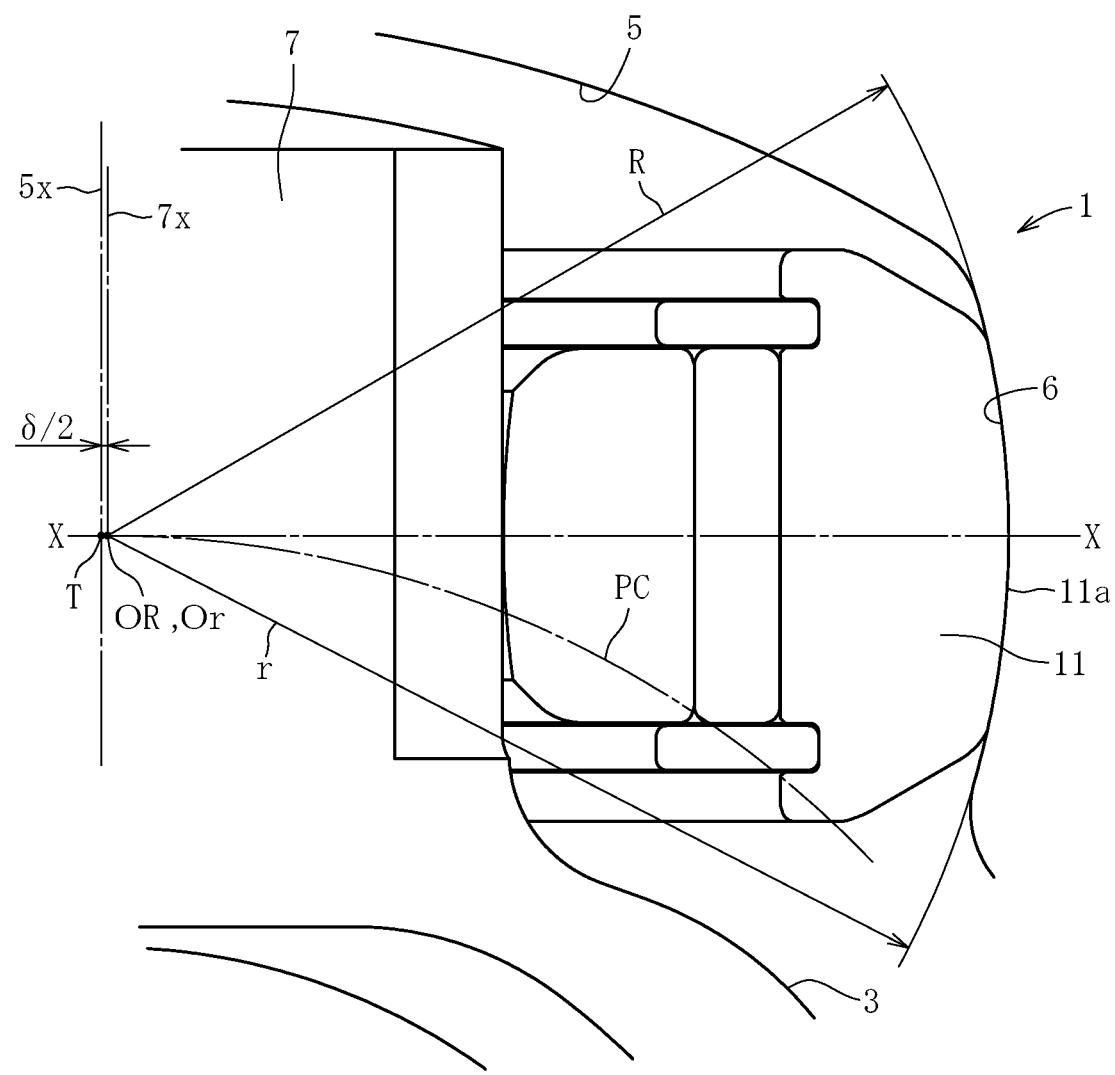
FIG. 22 is a partial cross-sectional view for illustrating a tripod type constant velocity universal joint according to a second embodiment of the present invention in a state in which the outer peripheral surface of the roller and the roller guide surface are held in abutment against each other during torque application in FIG. 8 used for description of the first embodiment.
Figure 23:
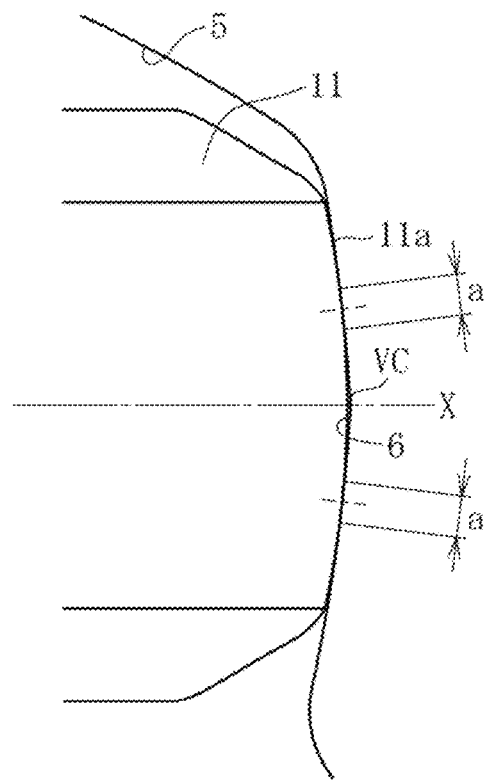
FIG. 23 is a partial cross-sectional view for illustrating a related art in which the outer peripheral surface of the roller and the roller guide surface are held in angular contact with each other.
Figure 24:
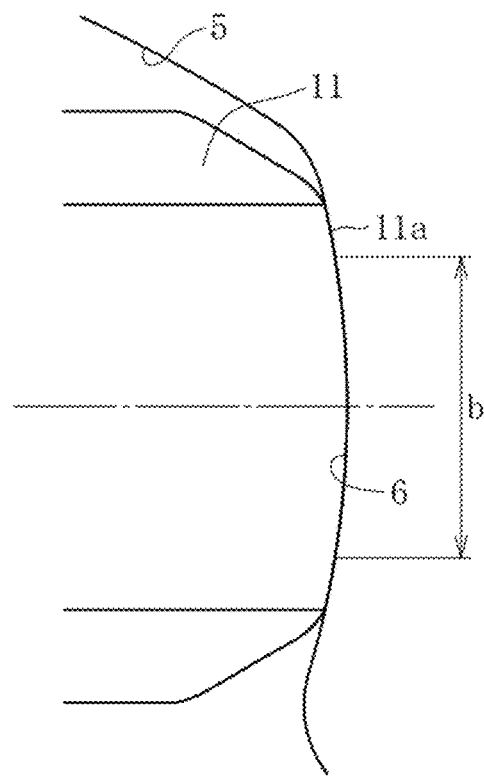
FIG. 24 is a partial cross-sectional view for illustrating the second embodiment in which the outer peripheral surface of the roller and the roller guide surface are held in contact with each other in a substantially entire region of the outer peripheral surface of the roller in a width direction thereof.

The tripod type constant velocity universal joint according to the second embodiment of the present invention is specifically described with reference to FIG. 1, FIG. 2, and FIG. 22 to FIG. 28. FIG. 22 is a partial cross-sectional view for illustrating the tripod type constant velocity universal joint according to the second embodiment in a state in which the outer peripheral surface of the roller and the roller guide surface are held in abutment against each other during torque application in FIG. 8 used for description of the first embodiment. FIG. 23 is a partial cross-sectional view for illustrating a related art in which the outer peripheral surface of the roller and the roller guide surface are held in angular contact with each other. FIG. 24 is a partial cross-sectional view for illustrating this embodiment in which the outer peripheral surface of the roller and the roller guide surface are held in contact with each other in a substantially entire region of the outer peripheral surface of the roller in the width direction.

The tripod type constant velocity universal joint according to the second embodiment has a new technical object to further reduce and stabilize the induced thrust. However, an overall configuration of the tripod type constant velocity universal joint according to the second embodiment is the same as that described in the first embodiment with reference to FIG. 1 and FIG. 2, and hence the contents described in the first embodiment are incorporated in the second embodiment. A main point is described below.

With reference to FIG. 22, description is made of a contact mode between the outer peripheral surface $11a$ of the roller 11 and the roller guide surface 6 of the tripod type constant velocity universal joint 1 according to the second embodiment. The outer peripheral surface $11a$ of the roller 11 is formed of the partially spherical surface having the curvature radius "r" and having the curvature center Or on the axis $7x$ of the leg shaft 7. The roller guide surface 6 is formed of the partially cylindrical surface having the curvature radius R and having the curvature center OR on the horizontal line X-X passing the intersection T of the pitch circle PC of the track grooves 5 and the center line $5x$ of the track groove 5. The curvature radius R of the partially cylindrical surface of the roller guide surface 6 and the curvature radius "r" of the partially spherical surface of the outer peripheral surface $11a$ of the roller 11 satisfy the relation of R=r, and satisfy the contact ratio R/r=1.00. The curvature center OR of the partially cylindrical surface of the roller guide surface 6 having the curvature radius R is shifted by the gap $\delta/2$ from the center line $5x$ of the track groove 5 on the horizontal line X-X. During torque application, the curvature center OR matches the curvature center Or, which is located on the axis $7x$ of the leg shaft 7, of the partially spherical surface of the outer peripheral surface $11a$ of the roller 11 having the curvature radius "r".

In the joint according to this embodiment satisfying the curvature radius R=r (the contact ratio R/r=1.00), when torque is applied to the joint, as illustrated in FIG. 22, the outer peripheral surface $11a$ of the roller 11 and the roller guide surface 6 are held in contact with each other in an entire region of the outer peripheral surface $11a$ of the roller 11 in the width direction.

With regard to a contact mode between the outer peripheral surface $11a$ of the roller 11 and the roller guide surface 6, the tripod type constant velocity universal joint 1 according to the second embodiment and an existing product being the related art are described in contrast to each other. In the related art, as illustrated in FIG. 23, the outer peripheral surface $11a$ of the roller 11 and the roller guide surface 6 are held in angular contact with each other. In the angular contact, there are two contact regions "a" each having a certain contact angle. A vertex gap VC is defined between the two contact regions "a", and serves as a reservoir for a lubricating oil. The related art follows a field-proven contact mode.

In contrast, in this embodiment illustrated in FIG. 24, a large contact region "b" can be formed in the width direction of the outer peripheral surface $11a$ of the roller 11. Accordingly, to a total 2a of the two contact regions "a" in the related art illustrated in FIG. 23, the contact region "b" in this embodiment illustrated in FIG. 24 satisfies a relation of 2a<b. In FIG. 24, there is exemplified a case in which the contact ratio R/r is set to a value that is approximate to 1.00 but larger than 1.00.

Figure 25:
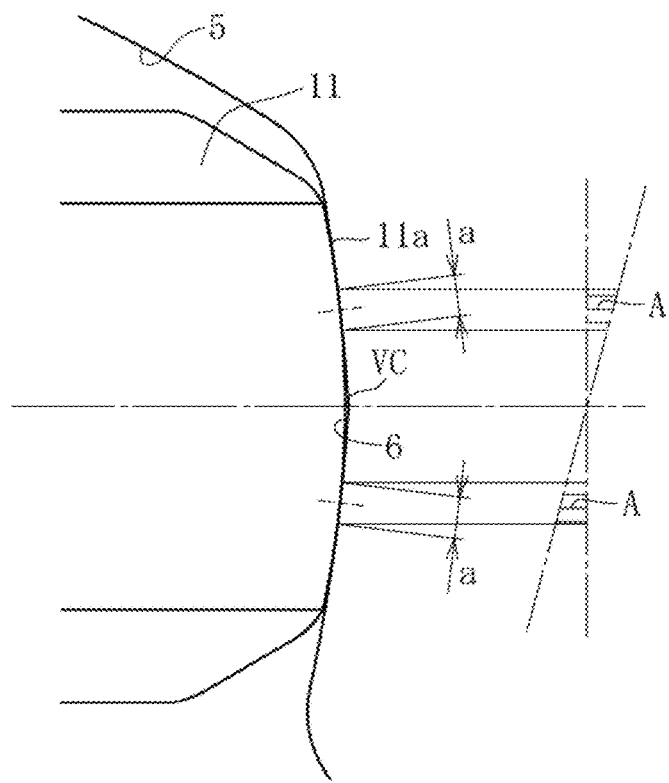
FIG. 25 is an explanatory view for illustrating resistance at the time of inclination of the roller in the related art in which the outer peripheral surface of the roller and the roller guide surface are held in angular contact with each other as illustrated in FIG. 23.
Figure 26:
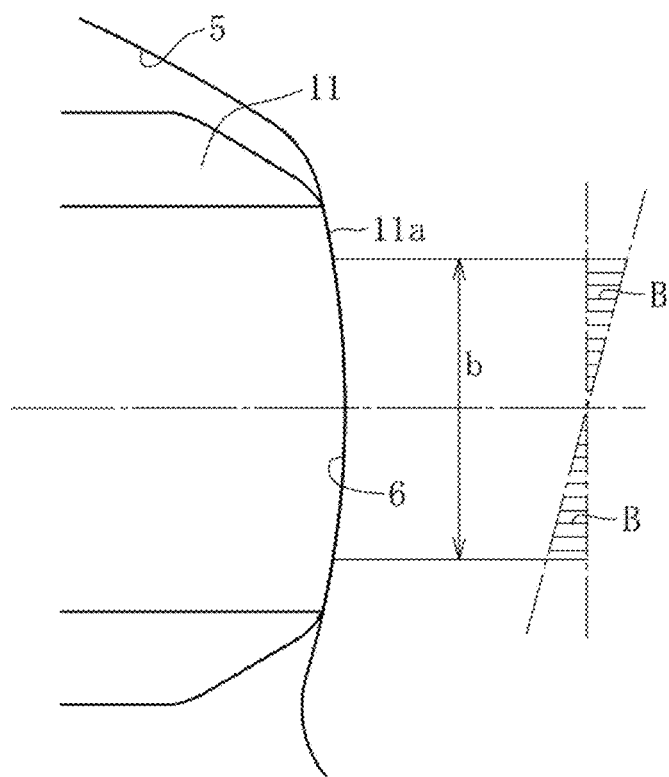
FIG. 26 is an explanatory view for illustrating resistance at the time of inclination of the roller in the second embodiment illustrated in FIG. 24.
Figure 27:
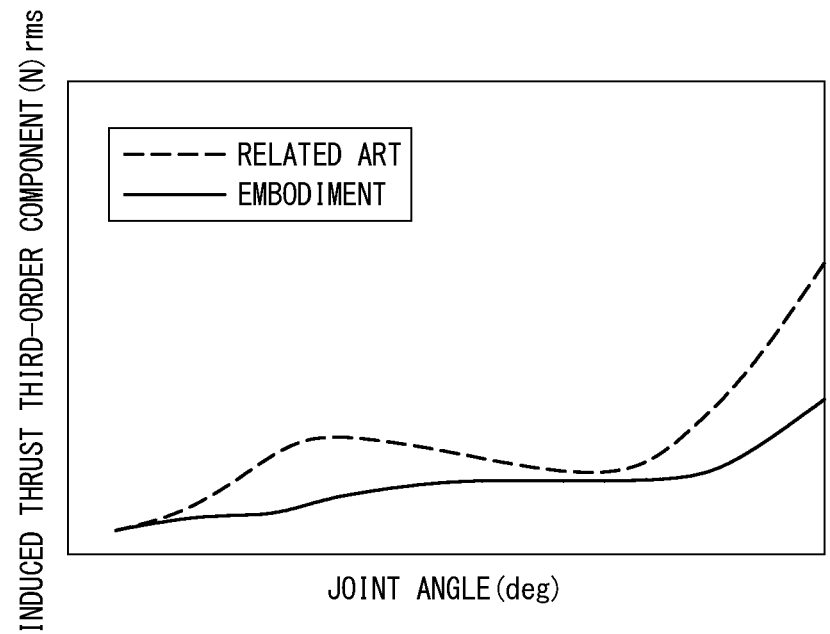
FIG. 27 is a graph for showing measurement results of induced thrust in the related art and the second embodiment.

Next, with reference to FIG. 25 to FIG. 27, consideration is given on a difference in resistance at the time of inclination of the roller 11 between the related art and this embodiment. FIG. 25 is an explanatory view for illustrating resistance at the time of inclination of the roller in the related art in which the outer peripheral surface of the roller and the roller guide surface are held in angular contact with each other as illustrated in FIG. 23. FIG. 26 is an explanatory view for illustrating resistance at the time of inclination of the roller in this embodiment illustrated in FIG. 24. FIG. 27 is a graph for showing measurement results of induced thrust in the related art and this embodiment.

As illustrated in FIG. 25, in the related art in which the contact mode between the outer peripheral surface 11a of the roller 11 and the roller guide surface 6 is angular contact, the resistance at the time of inclination of the roller 11 is considered to be represented by an area 2A of a total of hatched portions A. In contrast, as illustrated in FIG. 26, in this embodiment in which the large contact region is formed in the width direction of the outer peripheral surface 11a of the roller 11, the resistance at the time of inclination of the roller 11 is considered to be represented by an area 2B of a total of hatched portions B. As a result, as compared to the roller 11 in the related art, the roller 11 in this embodiment is easily retained in a horizontal direction of the roller guide surface 6 of the track groove 5 under torque application. That is, the roller 11 is less liable to be inclined with respect to the roller guide surface 6 of the track groove 5. Thus, it is considered that horizontal movement is spurred, thereby being capable of reducing the induced thrust.

In FIG. 27, there are shown the measurement results of the induced thrust (third-order component) with respect to a joint angle in the related art and this embodiment. It is understood that, even when the joint angle is large, the induced thrust is more stabilized at a low level in this embodiment in which the large contact region is formed in the width direction of the outer peripheral surface 11a of the roller 11 than in the related art in which the contact mode between the outer peripheral surface 11a of the roller 11 and the roller guide surfaces 6 is angular contact. The tripod type constant velocity universal joint 1 according to this embodiment also has such an effect that the roller 11 is allowed to smoothly slide on the roller guide surfaces 6 under application of no torque.

Figure 28A:
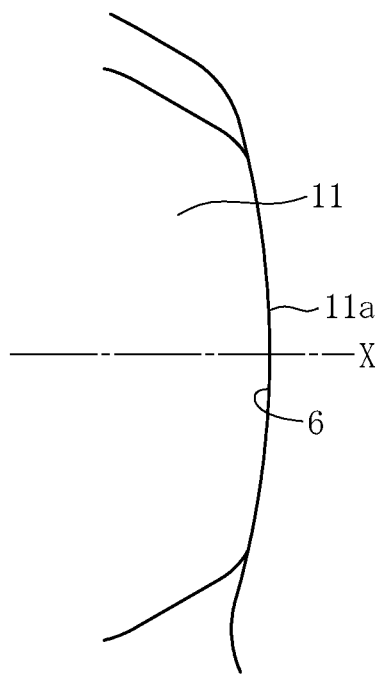
FIG. 28a is a view for illustrating one of different examples of the contact ratio R/r in the second embodiment, where the contact ratio R/r=1.00 is given.
Figure 28B:
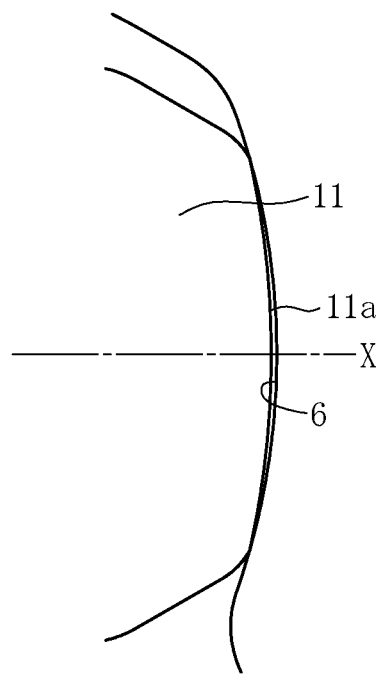
FIG. 28b is a view for illustrating another one of different examples of the contact ratio R/r in the second embodiment, where the contact ratio R/r=0.95 is given.

FIG. 28 are views for illustrating different examples of the contact ratio R/r in this embodiment. In FIG. 28a, the contact ratio R/r=1.00 is given. In FIG. 28b, the contact ratio R/r=0.95 is given. However, also in this embodiment, it is desired that the contact ratio R/r of the curvature radius R of the partially cylindrical surface of the roller guide surface 6 to the curvature radius "r" of the partially spherical surface of the outer peripheral surface 11a of the roller 11 satisfy $0.95 \leq R/r \leq 1.08$.

Technical measures for reducing and stabilizing the induced thrust in the tripod type constant velocity universal joint 1 according to the second embodiment are summarized as follows.

(1) In the tripod type constant velocity universal joint in which the inner ring of the roller unit is externally fitted to each leg shaft, the roller unit can be inclined with respect to the leg shaft, and the roller is movable along the roller guide surfaces of the track groove and can be inclined in the track groove.

(2) The outer peripheral surface of the roller is formed of the partially spherical surface having the curvature center on the axis of the leg shaft.

(3) The roller guide surface is formed of the partially cylindrical surface having the curvature center on the horizontal line passing the intersection of the pitch circle of the track grooves and the center line of the track groove.

(4) The contact ratio R/r of the curvature radius R of the partially cylindrical surface of the roller guide surface to the curvature radius "r" of the partially spherical surface of the outer peripheral surface of the roller is set to satisfy $0.95 \leq R/r \leq 1.08$ so that the induced thrust of the joint is reduced.

The technical measures for reducing and stabilizing the induced thrust in the tripod type constant velocity universal joint according to the second embodiment are also applicable to a tripod type constant velocity universal joint according to a third embodiment. The tripod type constant velocity universal joint according to the third embodiment is described with reference to FIG. 29, which is a cross-sectional view for illustrating the tripod type constant velocity universal joint according to the third embodiment.

Figure 29:
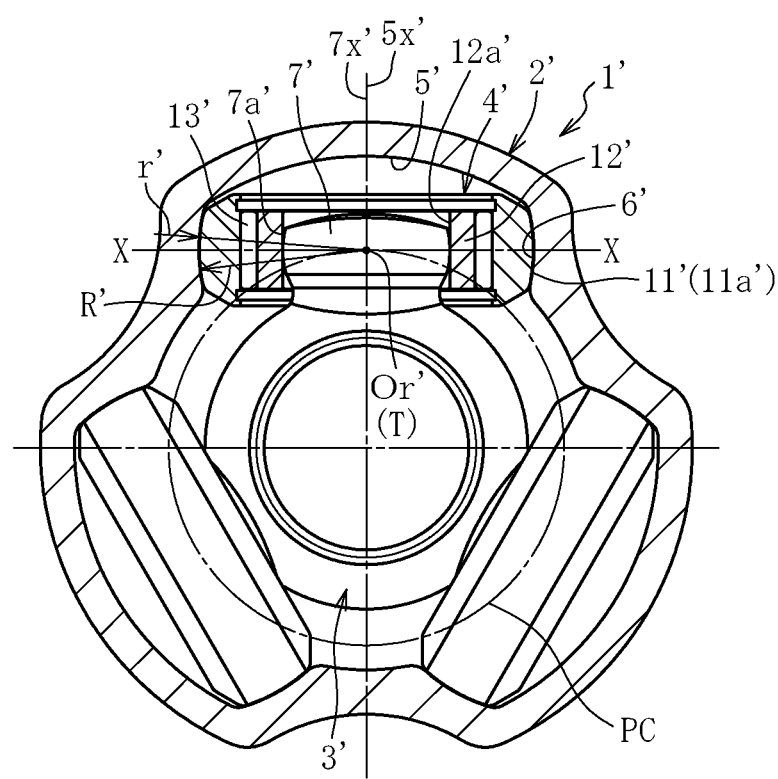
FIG. 29 is a cross-sectional view for illustrating a tripod type constant velocity universal joint according to a third embodiment of the present invention.

As illustrated in FIG. 29, a tripod type constant velocity universal joint 1' according to this embodiment is different from the second embodiment in the following points. An outer peripheral surface 7a' of each of leg shafts 7' of a tripod member 3' is formed of a spherical surface. An inner ring 12' of a roller unit 4' comprises a cylindrical inner peripheral surface 12a'. The cylindrical inner peripheral surface 12a' of the inner ring 12' is externally fitted to the spherical outer peripheral surface 7a' of each of the leg shafts 7' of the tripod member 3' so as to be slidable. Other configurations are the same as those in the second embodiment. Accordingly, components having the same functions are denoted by the same reference symbols (with prime symbols), and a main point is described.

The roller unit 4' comprises, as main components, a roller 11', the inner ring 12', and a plurality of needle rollers 13' incorporated between the roller 11' and the inner ring 12' in a full type. The roller unit 4' is received in each of track grooves 5' of an outer joint member 2', and a center of the roller unit 4' (or the roller 11') in a width direction thereof is located on a pitch circle PC of the track grooves 5'. An outer peripheral surface 11a' of the roller 11' is formed of a partially spherical surface having a curvature radius r' and having a curvature center Or' on an axis 7x' of the leg shaft 7'.

The tripod member 3' comprises the three leg shafts 7' projecting in a radial direction of the tripod member. The outer peripheral surface 7a' of each of the leg shafts 7' is formed of a spherical surface having a curvature center on the axis 7x' of the leg shaft 7', and the cylindrical inner peripheral surface 12a' of the inner ring 12' of the roller unit 4' is externally fitted to the spherical outer peripheral surface 7a' so as to be slidable. When the joint takes an operating angle, the roller unit 4' can be inclined with respect to the axis of the leg shaft 7' of the tripod member 3'. Accordingly, the roller 11' of the roller unit 4' and roller guide surfaces 6' are prevented from being brought into an oblique state, and the roller 11' can roll properly.

The roller guide surfaces 6' are each formed of a partially cylindrical surface having a curvature radius R' and having a curvature center on a horizontal line X'-X' passing an intersection T' of the pitch circle PC of the track grooves 5' and a center line 5x' of the track groove 5', and extends in parallel to the axis of the joint. Also in this embodiment, it is desired that a contact ratio R'/r' of the curvature radius R' of the partially cylindrical surface of the roller guide surface 6' to the curvature radius r' of the partially spherical surface of the outer peripheral surface 11a' of the roller 11' satisfy $0.95 \leq R'/r' \leq 1.08$. Also in this embodiment, a large contact region is formed in the width direction of the outer peripheral surface 11a' of the roller 11', and hence the induced thrust is stabilized at a low level. Further, the tripod type constant velocity universal joint 1' according to this embodiment also has such an effect that the roller 11' is allowed to smoothly slide on the roller guide surfaces 6' under application of no torque.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 tripod type constant velocity universal joint
2 outer joint member
3 tripod member
4 roller unit
5 track groove
5x center line of track groove
6 roller guide surface
7 leg shaft
7x axis of leg shaft
9 shaft
11 roller
11a outer peripheral surface
11e end portion
12 inner ring
12a inner peripheral surface
13 needle roller
C contact point
K retreat portion
Lc widthwise center region
PC pitch circle of track grooves
Q rounded portion
R curvature radius of partially cylindrical surface of roller guide surface
T intersection
X-X horizontal line
a major axis
b minor axis
m gap
r curvature radius of partially spherical surface of outer peripheral surface of roller
θ contact angle
δ track gap

The invention claimed is:

1. A tripod type constant velocity universal joint, comprising:
an outer joint member having three track grooves each comprising roller guide surfaces arranged so as to be opposed to each other in a circumferential direction of a corresponding one of the track grooves;
a tripod member comprising three leg shafts projecting in a radial direction of the tripod member; and
roller units each comprising a roller and an inner ring configured to support the roller in a freely rotatable manner,
the inner ring of each of the roller units being externally fitted to one of the leg shafts,
the roller units being capable of inclining with respect to the leg shafts, respectively, and
each of the rollers being movable along the roller guide surfaces of one of the track grooves, and being capable of inclining in the one of the track grooves,
wherein an outer peripheral surface of the rollers is formed of a partially spherical surface having a curvature center on an axis of one of the leg shafts,
wherein the roller guide surfaces are each formed of a partially cylindrical surface having a curvature center on a horizontal line passing an intersection of a pitch circle of the track grooves and a center line of one of the track grooves,
wherein the curvature centers of the partially cylindrical surfaces of the roller guide surfaces are located at positions offset from center lines of the track grooves,
wherein under a state in which no torque is applied to the tripod type constant velocity universal joint, an end portion of the outer peripheral surface of at least one of the rollers is held in abutment against the roller guide surfaces of one of the track grooves, and
wherein a contact ratio R/r of a curvature radius R of the partially cylindrical surface of the roller guide surfaces to a curvature radius "r" of the partially spherical surface of the outer peripheral surface of each of the rollers is set to satisfy $0.95 \leq R/r \leq 1.08$ so that induced thrust of the tripod type constant velocity universal joint is reduced.

2. A tripod type constant velocity universal joint, comprising:
an outer joint member having three track grooves each comprising roller guide surfaces arranged so as to be opposed to each other in a circumferential direction of a corresponding one of the track grooves;
a tripod member comprising three leg shafts projecting in a radial direction of the tripod member; and
roller units each comprising a roller and an inner ring configured to support the roller in a freely rotatable manner,
each of the inner rings being externally fitted to one of the leg shafts,
each of the rollers being movable along the roller guide surfaces of one of the track grooves,
each of the inner rings comprising an inner peripheral surface formed into an arc-shaped protruding surface in a longitudinal section of the inner ring,
each of the leg shafts comprising an outer peripheral surface having a straight shape in a longitudinal section containing an axis of the leg shaft, and having a substantially elliptic shape in a cross section orthogonal to the axis of the leg shaft,
the outer peripheral surface of each of the leg shafts being brought into abutment against the inner peripheral surface of one of the inner rings in a direction orthogonal to an axis of the tripod type constant velocity universal joint, and defining a gap in a direction of the axis of the tripod type constant velocity universal joint together with the inner peripheral surface of the inner ring, and
each of the rollers being capable of inclining in one of the track grooves,
wherein an outer peripheral surface of each of the rollers is formed of a partially spherical surface having a curvature center on the axis of one of the leg shafts,
wherein the roller guide surfaces are each formed of a partially cylindrical surface having a curvature center on a horizontal line passing an intersection of a pitch circle of the track grooves and a center line of one of the track grooves,
wherein the curvature centers of the partially cylindrical surfaces of the roller guide surfaces are located at positions offset from center lines of the track grooves, and
wherein under a state in which no torque is applied to the tripod type constant velocity universal joint, an end portion of the outer peripheral surface of at least one of the rollers is held in abutment against the roller guide surfaces of one of the track grooves.

3. The tripod type constant velocity universal joint according to claim 2, wherein a contact ratio R/r of a curvature radius R of the partially cylindrical surface of the roller guide surfaces to a curvature radius "r" of the partially spherical surface of the outer peripheral surface of the rollers is set to satisfy $0.95 \leq R/r \leq 1.08$.

4. The tripod type constant velocity universal joint according to claim 2, wherein rolling elements are arranged between the inner rings and the rollers.

5. The tripod type constant velocity universal joint according to claim 3, wherein a rounded portion having a curvature radius smaller than the curvature radius "r" of the partially spherical surface of the outer peripheral surface of the rollers is formed at each end portion of the outer peripheral surface of the rollers.

6. The tripod type constant velocity universal joint according to claim 4, wherein the rolling elements comprise needle rollers.

7. The tripod type constant velocity universal joint according to claim 2,
   wherein a widthwise center region of the outer peripheral surface of the rollers is formed of the partially spherical surface, and
   wherein a retreat portion is formed in a region extending from the widthwise center region to the end portion of the outer peripheral surface of the rollers, and the outer peripheral surface of each of the rollers has a convex shape.

* * * * *